(12) United States Patent
Bickle

(10) Patent No.: US 8,813,092 B2
(45) Date of Patent: Aug. 19, 2014

(54) CORBA EMBEDDED INTER-ORB PROTOCOL (EIOP)

(75) Inventor: Gerald L. Bickle, Columbia City, IN (US)

(73) Assignee: Raytheon Company, Waltham, MA (US)

( * ) Notice: Subject to any disclaimer, the term of this patent is extended or adjusted under 35 U.S.C. 154(b) by 429 days.

(21) Appl. No.: 13/271,412

(22) Filed: Oct. 12, 2011

(65) Prior Publication Data

US 2013/0097616 A1    Apr. 18, 2013

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ............................................. 719/315

(58) Field of Classification Search
None
See application file for complete search history.

(56) References Cited

U.S. PATENT DOCUMENTS

| | | | |
|---|---|---|---|
| 6,737,992 B1 | 5/2004 | Wolthuis | |
| 7,017,140 B2 | 3/2006 | Haji-Aghajani et al. | |
| 7,039,597 B1 | 5/2006 | Notani et al. | |
| 7,151,925 B2 | 12/2006 | Ting et al. | |
| 7,367,020 B2 | 4/2008 | Bickle et al. | |
| 7,487,493 B1 | 2/2009 | Faulkner | |
| 7,680,515 B2 | 3/2010 | Cho et al. | |
| 7,689,207 B2 | 3/2010 | Hinterberger et al. | |
| 7,784,029 B2 | 8/2010 | Hassan et al. | |
| 7,882,506 B2 * | 2/2011 | Chacko et al. | 719/313 |
| 7,954,108 B2 | 5/2011 | Paniscotti et al. | |
| 2002/0046294 A1 | 4/2002 | Brodsky et al. | |
| 2002/0099738 A1 | 7/2002 | Grant | |
| 2003/0114163 A1 | 6/2003 | Bickle et al. | |
| 2004/0078788 A1 | 4/2004 | Wong | |
| 2004/0221292 A1 | 11/2004 | Chiang et al. | |
| 2007/0061820 A1 | 3/2007 | Chacko et al. | |
| 2007/0078924 A1 | 4/2007 | Hassan et al. | |
| 2008/0109828 A1 | 5/2008 | Cho et al. | |
| 2010/0070524 A1 | 3/2010 | Bae et al. | |
| 2010/0185541 A1 | 7/2010 | Hassan et al. | |
| 2010/0242020 A1 | 9/2010 | Cho et al. | |
| 2010/0313197 A1 | 12/2010 | Cho et al. | |

OTHER PUBLICATIONS

Sandeep Adwankar, "Mobile CORBA", Sep. 17, 2001, IEEE, DOA '01 Proceedings 3rd International Symposium, pp. 52-63.*
Lankes et al., "Integration of a CAN-based Connection-oriented Communication Model into Real-Tme CORBA", Apr. 2003, IEEE, Parrallel and Distributed Processing Symposium, pp. 1-8.*

(Continued)

*Primary Examiner* — Emerson Puente
*Assistant Examiner* — Kimbleann Verdi
(74) *Attorney, Agent, or Firm* — Daly, Crowley, Mofford & Durkee, LLP

(57) ABSTRACT

A non-transient computer-readable storage medium that stores computer program code is provided. When this code is loaded into a computer system and executed thereon, it causes the computer to compile an interface definition language (IDL) configured to provide a custom inter-orb protocol (custom IOP), configure a message header for a message in accordance with to a specification in the IDL for at least a custom-IOP message header, and define a custom-IOP message header to replace the corresponding Common Object Resource Broker Architecture (CORBA) General Inter-Orb (GIOP) message header, wherein the custom-IOP message header requires fewer bits overall than the corresponding GIOP message header by changing or eliminating at least a portion of the fields in the corresponding GIOP message header.

27 Claims, 25 Drawing Sheets

EIOP Message Header Major Version 1

| MSB 72 | 16 bits | | | | | | LSB 74 |
|---|---|---|---|---|---|---|---|
| Spare2 76 | Message Type (4 bits) 78 | In Use Indicator (1 bit) 80 | Endian Indicator (1 bit) 82 | Service Context Indicator (1 bit) 84 | Spare (1 bit) 86 | EIOP Indicator Minor (2 bits) 88 | EIOP Indicator Major (2 bits) 90 |
| Message Length (2 bytes) 94 | | | | | | | |

(56) References Cited

OTHER PUBLICATIONS

Kim et al., "Resource-Conscious Customization of CORBA for CAN-based Distributed Embedded Systems", Mar. 15, 2000, IEEE, Object-Oriented Real-Time Distributed Computing, pp. 34-41.*
U.S. Appl. No. 13/373,761, filed Nov. 29, 2011, file through Feb. 21, 2012, 112 pages.
U.S. Pat. No. 7,367,020, issued Apr. 29, 2008, U.S. Appl. No. 10/207,315, filed Jul. 29, 2002, file through Feb. 21, 2012, 314 pages.
Notification of International Search Report of the International Searching Authority for PCT/US2002/24042, dated Jan. 24, 2003, 4 pages.
Letter from FA dated Feb. 5, 2012 with Office Action from Israel Patent Office for PCT/US2002/24042, dated Oct. 13, 2010, 6 pages.
Aguayo et al., "Design and Implementation of an SCA Core Framework for a DSP Platform", Proceedings of the SDR '09 Technical Conference and Product Exposition (2009), 6 pages, http://www.sdrforum.org/pages/sdr06/sdr06_papers/2.4/2.4-2.pdf.
Bernier et al., "SCA Advanced Features—Optimizing Boot Time, Memory Usage, and Middleware Communications", Proceedings of the SDR '09 Technical Conference and Product Exposition (SDR Forum 2009), 8 pages, http://data.memberkicks.com/site/sdf/sdr09-1569202633.pdf.
Bickle, Jerry, "Next Generation SCA Operating Environments", Proceeding of the SDR 06 Technical Conference and Product Exposition, PrismTech Corp., Burlington, MA, 5 pages, Nov. 2006.
"Building Distributed Applications With CORBA and XML", Sep. 30, 2010, http://xml.sys-con.com/node/40033/print, SYS-CON Media Inc., 6 pages.
Cruz et al., "An Approach to a Compact JTRS SCA Core Framework for Handheld Radios", Proceedings of the SDR '02 Technical Conference and Product Exposition (SDR Forum 2002), 8 pages.
Dohse et al., "General Dynamics C4 Systems Optimized CORBA to Meet SDR Requirements", Jul. 15, 2004, 12 pages.
Friedman et al., "A Case for Efficient Portable Serialization in CORBA (Preliminary Version)", Technion, CS-2005-18, pp. 1-8, 2005.
Giddings et al., "Zeligsoft Component Based Software Design Using CORBA", www.zeligsoft.com, 12 pages, 2005.
Hayes, Neli "Software Communications Architecture", OMG Workshop on Distributed Object Computing for Real-Time and Embedded Systems, Jul. 2003, The Boeing Company, Anaheim, CA, 226 pages.
Hermeling et al., "Zeligsoft Developing SCA Compliant Systems", www.zeligsoft.com, 12 pages, 2005.
"Joint Program Executive Office Joint Tactical Radio System", CORBA Neutral Representation, Dec. 2, 2010, JTRS SCA Working Group, JPEO JTRS, 9 pages.
Linn, Charles A, "A Simple, Lightweight Communications Architecture Facilitating SCA Application Portability", Proceedings of the SDR '09 Technical Conference and Product Exposition (2009), 6 pages.
"OMG SBC Workshop: Realizing the Vision SCA Evolution and Standardization", Presented by Jerry Bickle, Mar. 7, 2007, PrismTech Productivity Toosl and Middleware, 24 pages.
Paniscotti et al., "Next-Generation SDR Operating Environment Takes on Swap Challenges in Resource-Constrained Platforms", Trends in SDR and Reconfigurable Computing, 3 pages, Military Embedded Systems Jul. 2007.
Quinn et al., "Strategic Adaptation of SCA for STRS", NASA/CR-2007-214688 (Apr. 2007), 11 pages, citeseerx.ist.psu.edu/viewdoc/download?doi=10.0.1.116.8633.
Richardson, Kevin, "Software Communications Architecture and Related Specifications Overview", Apr. 9, 2006.
Robert et al., "Appendix A Embedded Software Defined Radio (SDR) With the OSSIE Core Framework", Jul. 27, 2005, DCI Postdoctoral Research Fellowship and the MPRG Affiliates Program, 7 pages.
Robert et al., "OSSIE: Open Source SCA for Researchers", Proceeding of the SDR 04 Technical Conference and Product Exposition, 7 pages, http://www.sdrforum.org/pages/sdr04/3.2%20sca%20waveform%20design%20robert/3.2-3%20robert.pdf, 2004.
Robert, Dr. Max, "World'S First Open-Source C++ Implementation of the SCA Released by MPRG", Proceeding of the SDR 02 Technical Conference and Product Exposition, 6 pages, 2002.
Schoenfelder, "Software Communication Architecture Radio Environment Performance Considerations", Proceedings of the SDR '09 Technical Conference and Product Exposition (2009), 6 pages, data.memberclicks.com/site/sdf/sdr09-1569204625.pdf.
"Software Communications Architecture Extensions", Dec. 22, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 15 pages.
"Software Communications Architecture Specification, Appendix A: Glossary", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 10 pages.
"Software Communications Architecture Specification, Appendix B: SCA Application Environment Profile", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 21 pages.
"Software Communications Architecture Specification, Appendix C: Core Framework IDL", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 41 pages.
"Software Communications Architecture Specification, Appendix D: Domain Profile", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 64 pages.
"Software Communications Architecture Specification, Attachment 2 to Appendix D: Common Properties Definitions", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 6 pages.
"Software Communications Architecture Specification", May 15, 2006, Version 2.2.2, Prepared by: JTRS Standards, Joint Program Executive Office (JPEO) Joint Tactical Radio System (JTRS), Space and Naval Warfare Systems Center San Diego, San Diego, CA, 126 pages.
"Software Communications Architecture Specification", MSRC-5000SCA, V2.2, Nov. 17, 2001, Prepared for the Joint Tactical Radio System (JTRS) Joint Program Office, Prepared by the Modular Software-programmable Radio Consortium under Contract No. DAAB15-00/3/0001, 371 pages.
Gailliard et al., "Mapping Semantics of CORBA IDL and GIOP to Open Core Protocol for Portability and Interoperability of SDR Waveform Components", Thales Communications A.A., Colombes, France. EDAA, 2008, 6 pages. Available at http://www.date-conference.com/proceedings/PAPERS/2008/DATE08/PDFFILES/03.4_1.pdf.
Kuhns et al., "The Design and Performance of a Pluggable Protocols Framework for Object Request Broker Middleware", Dept. of Computer Science, Washington University, St. Louis, MO 63130, USA , Aug. 25-27, 1999 in Salem, MA, 15 pages. Found at http://www.cse.wustl.edu/~schmidt/PDF/PfHSN.pdf.
Kim et al., "Resource-Conscious Customization of CORBA for CAN-based Distributed Embedded Systems", School of Electrical Engineering and ERC-ACI, Seoul National University, Seoul, Korea. 19 pages. Printed May 2, 2011. Found at http://citeseerx.ist.psu.edu/viewdoc/download?doi=10.1.1.46.2116&rep=rep1&type=pdf.
Schmidt et al., "Applying Patterns to Develop a Pluggable Protocols Framework for ORB Middleware". Electrical & Computer Engineering Dept., University of CA, Irvine and the Dept. of Computer Science Washington University, St. Louis, MO. Apr. 3-7, 2000, 23 pages. Found at http://www.cse.wustl.edu/~schmidt/PDF/pluggable_protocols.pdf.

(56) References Cited

OTHER PUBLICATIONS

Subramonian et al., "Middleware Specialization for Memory-Constrained Networked Embedded Systems", Dept. of Computer Science and Engineering, Washington University, St. Louis, MO. 8 pages. Printed May 2, 2011. Found at http://www.cse.msu.edu/~glxing/docs/rtas04_nORB.pdf.
Adwankar, "Mobile CORBA", Networks and Infrastructure Department, Motorola Labs, 1301 E. Algonquin Road, Schaumburg, IL. Printed May 2, 2011, 12 pages. Found at http://citeseerx.ist.psu.edu/viewdoc/download?doi=10.1.1.91.2489&rep=rep1&type=pdf.
Schmidt et al., "CISCO/Motorola Proposal, Using a Real-Time Embedded ORB for ATM Switch Control and Management". Printed May 2, 2011, 9 pages. Found at http://www.cs.wustl.edu/~schmidt/PDF/vsi.pdf.
Gokhale et al., "Optimizing a CORBA Inter-Orb Protocol (IIOP) Engine for Minimal Footprint Embedded Multimedia Systems", Bell Laboratories, Lucent Technologies, 600 Mountain Avenue, Murray Hill, NJ, and Dept. of Computer Science, Washington University, One Brookings Drive, St. Louis, MO. Printed May 2, 2011, 27 pages. Found at http://www.cse.wustl.edu/~schmidt/PDF/JSAC-99.pdf.
Coulson et al., "Implementing the CORBA GIOP in a High-Performance Object Request Broker Environment", Distributed Multimedia Research Group, Computing Department, Lancaster University, Lancaster, UK. Printed May 2, 2011, 18 pages.
Kloukinas, Christos, "Distributed Systems, Session 3: Communication in Distributed Systems", Dept. of Computing, City University London. PowerPoint Presentation, printed May 2, 2011, 72 pages.
U.S. Appl. No. 13/068,061, filed May 2, 2011, file through Oct. 5, 2011, 157 pages, Part1.
U.S. Appl. No. 13/068,061, filed May 2, 2011, file through Oct. 5, 2011, 226 pages, Part2.
U.S. Appl. No. 13/068,061, filed May 2, 2011, file through Oct. 5, 2011, 142 pages, Part3.
U.S. Appl. No. 13/068,061, filed May 2, 2011, file through Oct. 5, 2011, 268 pages, Part4.
U.S. Appl. No. 13/068,061, filed May 2, 2011, file through Oct. 5, 2011, 407 pages, Part5.
Common Object Request Broker Architecture (CORBA), Specification, Version 3.1, Part 1: CORBA Interfaces, 540 pages, Jan. 2008.
Common Object Request Broker Architecture (CORBA), Specification, Version 3.1, Part 2: CORBA Interoperability, 260 pages, Jan. 2008.
Bicer; "A Software Communications Architecture Compliant Software Defined Radio Implementation;" Thesis; Jun. 2002; 105 pages.
Gonzalez; "Design and Implementation of an Efficient SCA Framework for Software-Defined Radios;" Thesis; May 10, 2006; 94 pages.
Gonzalez, et al.; "Design and Implementation of an SCA Core Framework For A DSP Platform;" Proceeding of the SDR 06 Technical Conference and Product Exposition; May 2006; 6 pages.
Gonzalez, et al.; "Open Source SCA-Based Core Framework and Rapid Development Tools Enable Software-Defined Radio Education and Research;" IEEE Communications Magazine; Oct. 2009; pp. 48-55.
Griddings, et al; "Component Based Software Design using COBRA:"www.zelingsoft.com; 12 pages, 2005.
Hermeling, et al.; "Developing SCA Compliant Systems;" www.zelingsoft.com; 12 pages, 2005.
"JPEO JTRS initiates the development of a new Software Communications Architecture (SCA) Release;" News Release; Aug. 18, 2009; 7 pages.
Office Action dated Aug. 20, 2013 from U.S Appl No. 13/068,061.
Response to Office Action dated Aug. 20, 2013 filed on Nov. 19, 2013.
Office Action dated Sep. 13, 2013 from U.S. Appl. No. 13/373,761.
Response to Office Action in Israel Patent Application No. 160057, filed on Mar. 7, 2012, and cover letter, 7 pages.
Final Office Action in Israel Patent Application No. 160057 dated Sep. 12, 2013, and cover letter and translated pending claim set, 8 pages.
Response to Office Action in U.S. Appl. No. 13/373,761, filed Dec. 5, 2013, 17 pages.

* cited by examiner

Table 1 - IOP Header Comparison

| Header Field | | GIOP Header | EIOP Header Major Version 1 | EIOP Header Major Version 2 | Analysis |
|---|---|---|---|---|---|
| Field Byte Size | Identifier | 4 | 0 | 0 | No IOP Identifier for EIOP Header. |
| | IOP Indicators | 4 | 2 | 4 | EIOP Indicators and Flags are collapsed into 2 bytes instead of 4 bytes. EIOP Major version 2 has two reserved bytes. |
| | Message Length | 4 | 2 | 4 | EIOP Major version 1 Message Length is 2 bytes, whereas EIOP Major version 2 is 4 bytes in size, which is the same as GIOP. |
| | Total Bytes | 12 | 4 | 8 | |

FIG. 7

Table 2 - Request Header Comparison

| | Request Field | GIOP Request 1.2 | EIOP Request Minor 0 | EIOP Request Minor 1 | EIOP Request Minor 2 | Analysis |
|---|---|---|---|---|---|---|
| | Request ID | 4 | 2 | 2 | 2 | EIOP Request ID is reduced to a be a 13 bits number. For EIOP the Response Expected field is a 3 bits MSB field. |
| | Response Flags | 4 | 0 | 0 | 0 | For EIOP the Response Flags field is a 3 bits MSB field of the EIOP Request ID field. |
| | Addressing Disposition | 2 | 1 | 1 | 1 | For EIOP, the Addressing Disposition is one byte that can represent all addressing disposition modes (EIOP Object Key, Object Key, ProfileAddr, ReferenceAddr). |
| | Length of Object Key | 4 | 0 | 1 | 1 | Object Key for EIOP Minor 0 is a fixed size of 2 bytes, so object key length is not needed. EIOP Minor 1 and 2 has object key length of 1 byte instead of GIOP 4 bytes. |
| | Object Key/ProfileAddr/ Reference Addr | 32 | 2 | 32 | 32 | Per poa there should not be more than 256 objects in an embedded constrained environment. An estimate of 32 bytes is used for GIOP object key based upon industry average size. EIOP Minor 1 also has an IOP object key. EIOP Minor 2 allows profile and reference addressing. |
| Field Byte Size | Operation Name Length | 4 | 0 | 0 | 0 | For EIOP the operation name field is a fixed size so operation name length field is eliminated. |
| | Operation Name | 10 | 1 | 1 | 1 | A minimum estimate of 10 bytes for operation name is being used for GIOP but the size is unbounded. EIOP allows up to 256 operations per object. For GIOP an odd operation name size results in 0 to 3 bytes padding to align number of service contexts. |
| | Number of Service Contexts | 4 | 1 | 1 | 1 | For EIOP the present of service contexts is indicated at the IOP header level by a 1 bit value. The number of CORBA defined service contexts are 22. For Real - Time CORBA one would need service context. |
| | Service Context ID | 4 | 1 | 1 | 1 | For EIOP the service context length ID is a one byte value allowing for 256 service contexts. The number of CORBA defined service contexts are 22. |
| | Service Context Length | 4 | 1 | 1 | 1 | For EIOP the service context length is 1 byte, allowing 255 for the size of service context data. |
| | Service Context Data | | | | | No change here for EIOP. |
| | Marshaled Parameters | | | | | No change here for EIOP, padding will occur for certain types. |
| | Total Bytes without Service Context | 64 | 6 | 37 | 37 | |
| | Total Bytes with Service Context | 72 | 9 | 40 | 40 | |

*FIG. 10*

Table 3 - Reply Header Comparison

| Reply Field | GIOP Reply | EIOP Reply | Analysis |
|---|---|---|---|
| Request ID | 4 | 2 | EIOP Request ID is reduced to a be a 13 bits number. |
| Reply Status | 4 | 0 | For EIOP the Reply Status is part of the EIOP Request ID field, the 3 MSBs. |
| Number of Service Contexts | 4 | 1 | For EIOP the present of service contexts is indicated at the IOP header level by a 1 bit value. The number of CORBA defined service contexts are 22. For Real-Time CORBA one would need service context. |
| Service Context ID | 4 | 1 | For EIOP the service context ID is a one byte value allowing for 256 service contexts. |
| Service Context Length | 4 | 1 | For EIOP the service context length is 1 byte, allowing 255 for the size of service context data. |
| Service Context Data | | | No Change here for EIOP. |
| Marshaled Parameters | | | No Change here for EIOP, padding will occur for certain types. |
| Total Bytes without Service Context | 12 | 2 | |
| Total Bytes with Service Context | 20 | 5 | |

*FIG. 13*

Table 4 - Cancel Headers Comparison

| | Cancel Request Field | GIOP Cancel Request | EIOP Cancel Request | Analysis |
|---|---|---|---|---|
| Field Byte Size | Request ID | 4 | 2 | EIOP Request ID is reduced to a be a 13 bits number. |
| | Total Bytes | 4 | 2 | |

*FIG. 14*

Table 5 - Locate Request Comparison

| | Locate Request Field | GIOP Locate Request | EIOP Request Minor 0 | EIOP Request Minor 1 | EIOP Request Minor 2 | Analysis |
|---|---|---|---|---|---|---|
| Field Byte Size | Request ID | 4 | 2 | 2 | 2 | EIOP Request ID is reduced to a be a 13 bits number. |
| | Addressing Disposition | 2 | 1 | 1 | 1 | For EIOP, the Addressing Disposition is one byte that can represent all addressing disposition modes (EIOP Object Key, Object Key, ProfileAddr, ReferenceAddr). |
| | Length of Object Key | 4 | 0 | 1 | 1 | Object Key for EIOP Minor 0 is a fixed size of 2 bytes, so object key length is not needed. EIOP Minor 1 and 2 has object key length of 1 byte instead of GIOP 4 bytes. |
| | Object Key/ProfileAddr/ReferenceAddr | 32 | 2 | 32 | 32 | Per poa there should not be more than 256 objects in an embedded constrained environment. An estimate of 32 bytes is used for GIOP object key based industry average size. EIOP Minor 1 also IOP object keys to be defined. EIOP Minor 2 allows profile and reference addressing. |
| | Total Bytes | 42 | 5 | 36 | 36 | |

*FIG. 15*

Table 6 - Locate Reply Header Comparison

| Locate Request Field | GIOP Locate Reply | EIOP Locate Reply | Analysis |
|---|---|---|---|
| Request ID | 4 | 2 | EIOP Request ID is reduced to a be a 13 bits number. |
| Locate Status | 4 | 0 | For EIOP the Locate Status is part of the EIOP Request ID field, 3 MSBs. |
| Total Bytes | 8 | 2 | |

Field Byte Size

FIG. 16

Table 7 - Fragment Header Comparison

| Fragment Field | GIOP Fragment | EIOP Fragment | Analysis |
|---|---|---|---|
| Request ID | 4 | 2 | EIOP Request ID is reduced to a be a 13 bits number. |
| Total Bytes | 4 | 2 | |

Field Byte Size

FIG. 17

```
// File: EIOP.idl
// Embedded Inter-ORB Protocol ifndef _EIOP_IDL_
define _EIOP_IDL_ ifdef _PRE_3_0_COMPILER_
include <IOP.idl> pragma prefix "omg.org"
else
import ::IOP;
endif // _PRE_3_0_COMPILER_ module EIOP { ifndef _PRE_3_0_COMPILER_
    typeprefix EIOP "omg.org";
#endif // _PRE_3_0_COMPILER_

// There are two major versions and three minor versions of the EIOP
// defined.
// The difference between the two major and three minor EIOP versions
// is the EIOP message header definition.
// Also there are two EIOP definitions for those 2 EIOP major versions,
// which are light weight EIOP the default definition and a FULL EIOP
// definition that is equivalent to GIOP 1.3 definition but using
// EIOP definitions. FULL EIOP definition is turned on when the
// FULL_EIOP compile directive is defined.

#ifndef MAX_EIOP_MINOR_VERSION
#define MAX_EIOP_MINOR_VERSION 0
#endif
#ifndef MAX_EIOP_MAJOR_VERSION
#define MAX_EIOP_MAJOR_VERSION 1
endif typedef octet MsgType;
    const MsgType Request = 0;
    const MsgType Reply = 1;
    const MsgType MessageError = 6;
```

```
#ifdef FULL_EIOP              //GIOP Equivalent
    const MsgType CancelRequest = 2;
    const MsgType LocateRequest = 3;
    const MsgType LocateReply = 4;
    const MsgType CloseConnection = 5;
    const MsgType Fragment = 7;
#endif
#if MAX_EIOP_MAJOR_VERSION == 1
    // EIOP 1.0
    struct MessageHeader_1_0 {           // 4 byte header, only supports request message of 64k in size
        octet          flags1; // indicates eiop major version (2 LSBs) and minor version
(2 bits left of major version),
            // endian indicator bit (right of MSB), service context indicator bit (right of endian indicator)
            // In Use indicator bit (MSB)
        octet          flags2; // indicates Message Type (4 LSBs) and Spare2 (4 MSBs)
        unsigned short message_size;
    };
#else        // GIOP Equivalent on message size
    // EIOP 2.0
    typedef octet RequestReserved(2)
    struct MessageHeader_2_0 {                    // 8 byte header
        octet          flags1; // indicates eiop major version (2 LSBs) and minor version
(2 bits left of major version),
            // endian indicator bit (right of MSB), service context indicator bit (right of endian indicator)
            // In Use indicator bit (MSB)
        octet          flags2; // indicates Message Type (4 LSBs) and Spare2 (4 MSBs)
        RequestReserved        reserved;
        unsigned Long          message_size;
    };
```

```
#endif
    typedef octet ObjectKey[2];          // object key information is 2 bytes of information
                                          // bit 1 is the object number, byte 2 4 LSBs is
transient random number,                  // 2 bits left of transient random number is poa id,
right of MSB is transient indicator bit, and msb indicates user
                                          // indicator bit.

typedef unsigned short RequestID;     // 13 LSBs is request id typedef octet AddressingDisposition;

if MAX_EIOP_MINOR_VERSION == 0
//#ifndef FULL_EIOP         // Light weight EIOP object key only
    const AddressingDisposition      EIOP_KeyAddr         = 3;

union TargetAddress switch (AddressingDisposition)    {
        case EIOP_KeyAddr:               ObjectKey         eiop_object_key;
    };
endif if MAX_EIOP_MINOR_VERSION == 1
    const AddressingDisposition      KeyAddr              = 0;
    const AddressingDisposition      EIOP_KeyAddr         = 3;

union TargetAddress switch (AddressingDisposition)    {
        case KeyAddr:           IOP::ObjectKey            object_key;
        case EIOP_KeyAddr:      ObjectKey                 eiop_object_key;
    };
endif // Full EIOP that is GIOP Equivalent - EIOP Object Key added and all IOP addressing
if MAX_EIOP_MINOR_VERSION == 2
    const AddressingDisposition      KeyAddr              = 0;
    const AddressingDisposition      ProfileAddr          = 1;
    const AddressingDisposition      ReferenceAddr        = 2;
    const AddressingDisposition      EIOP_KeyAddr         = 3;
```

FIG. 18C

```
struct ICRAddressingInfo {
    unsigned long          selected_profile_index;
    IOP::IOR               ior;
};

union TargetAddress switch (AddressingDisposition) {
    case KeyAddr:          IOP::ObjectKey        object_key;
    case ProfileAddr:      IOP::TaggedProfile    profile;
    case ReferenceAddr:    IORAddressingInfo     ior;
    case EIOP_KeyAddr:     ObjectKey             eiop_object_key;
};
endif typedef octet ResponseFlags;
    const ResponseFlags NO_RESPONSE_EXPECTED = 0;
    const ResponseFlags SYNC_SCOPE_NONE = 0;
    const ResponseFlags SYNC_SCOPE_WITH_TRANSPORT = 0;
    const ResponseFlags SYNC_SCOPE_WITH_SERVER = 1;
    const ResponseFlags SYNC_SCOPE_WITH_TARGET = 3;
    const ResponseFlags RESPONSE_EXPECTED = 3;

strust RequestHeader_1_0 {
    RequestID        request_id;    // 13 LSBs for request id, the MSB 3 bits is response flags
    TargetAddress    target;
    octet            operation;     // integer value for operation name
};

typedef RequestHeader_1_0 RequestHeader_1_1;
typedef RequestHeader_1_0 RequestHeader_1_2;
typedef RequestHeader_1_0 RequestHeader_2_0;
typedef RequestHeader_1_0 RequestHeader_2_1;
typedef RequestHeader_1_0 RequestHeader_2_2;

typedef octet               ServiceId;
typedef sequence <octet>    ContextData;
struct ServiceContext {
    Service_Id      context_id;
    ContextData     context_data;
};
```

*FIG. 18D*

```
typedef sequence <ServiceContext> ServiceContextList;
struct RequestServiceContextHeader_1_0 {
    RequestHeader_1_0       request_header;
    ServiceContextList      service_context;
};
typedef RequestServiceContextHeader_1_0  RequestServiceContextHeader_2_0;

// Lightweight EIOP
typedef octet ReplyStatusType;
const ReplyStatusType NO_EXCEPTION = 0;
const ReplyStatusType USER_EXCEPTION = 1;
const ReplyStatusType SYSTEM_EXCEPTION = 2;
#ifdef FULL_EIOP // GIOP Equivalent
const ReplyStatusType LOCATION_FORWARD = 3;
const ReplyStatusType LOCATION_FORWARD_PERM = 4;
const ReplyStatusType NEEDS_ADDRESSING_MODE = 5;
endif struct ReplyHeader_1_0 {
    RequestID               request_id;         // 13 LSBs is request id, 3 MSEs is Reply Status
};

// EIOP 2.0
typedef ReplyHeader_1_0 ReplyHeader_2_0;

struct ReplyServiceContextHeader_1_0 {
    ReplyHeader_1_0         request_id;
    ServiceContextList      service_context;
};

// EIOP 2.0
typedef ReplyServiceContextHeader_1_0 ReplyServiceContextHeader_2_0;

struct SystemXxceptionReplyBody {
    string                  exception_id;
    unsigned long           minor_code_value;
    unsigned long           completion_status;
```

*FIG. 18E*

```
};
#ifdef FULL_EIOP // GIOP Equivalent
// based upon giop 1.3 definitionsfrom giop idl file but request ID is EIOP definition
    struct CancelRequestHeader {
        RequestID            request_id;
    };

structLocateRequestHeader {
        RequestID            request_id;
        TargetAddress        target;
    };

typedef octet LocateStatusType;
    const LocateStatusType UNKNOWN_OBJECT = 0;
    const LocateStatusType OBJECT_HERE = 1;
    const LocateStatusType OBJECT_FORWARD = 2;
    const LocateStatusType OBJECT_FORWARD_PERM = 3;
    const LocateStatusType LOC_SYSTEM_EXCEPTION = 4;
    const LocateStatusType LOC_NEEDS_ADDRESSING_MODE = 5;

structLocateReplyHeader {
        RequestID            request_id;   // 3 MSB bits is the LocateStatus
    };

struct FragmentHeader {
        RequestID            request_id;
    };
endif
};
#endif // _EIOP_IDL_
```

*FIG. 18F*

CORBA EMBEDDED INTER-ORB PROTOCOL (EIOP)

FIELD OF THE INVENTION

Embodiments of the invention generally relate to software communication architectures. More particularly, the invention relates to systems and methods that provide an optimized CORBA messaging protocol between distributed clients and servers.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The Common Object Request Broker Architecture (CORBA) middleware platform has been a leading middleware platform in recent years. As is known in the art, CORBA is a standard defined by the Object Management Group (OMG) that enables software components written in multiple computer languages and running on multiple computers to work together as a single application or set of services. CORBA uses an interface definition language (IDL) to specify interfaces that objects will present to the outside world, and specifies a mapping from the IDL to a specific implementation language. CORBA uses an Object Request Broker (ORB) to send requests from objects executing on one system to objects executing on another system. The ORB allows objects to interact in a heterogeneous, distributed environment, independent of the computer platforms on which the various objects reside and the languages used to implement them. CORBA is specified and further explained in the CORBA Specification, version 3.1 (January 2008), including Part 1 (CORBA Interface) and Part 2 (Interoperability), available from the Object Management Group (OMG) at 109 Highland Ave, Needham, Mass. 02494. The entire CORBA Specification, including at least Parts 1 and 2, is hereby incorporated by reference in its entirety.

CORBA communication typically occurs over an Ethernet or other network, between a Client and Server. FIG. 1 is an illustrative prior art block diagram 10 showing client 12 to server 14 communication, in accordance with CORBA, in an exemplary environment. FIG. 1 illustrates what happens when a client application 16 invokes an operation on an object/servant 24 in a server process 14. To implement an interface, CORBA IDL is compiled into the source code language with which the client 12 or server 14 is implemented. On the client side, this code is called a stub. On the server-side, this IDL code is called a skeleton. Typically, client-side application code 16 invokes a local proxy object 18 (e.g., via a proxy class generated by an IDL compiler). The proxy 18 gets information about the request (e.g., in and inout parameters, operation name) into a binary buffer, which is then passed into the ORB 20A library. The ORB 20A library sends a request message across the network to the server process 14. The ORB 20A waits for a reply message from the server process 14. The ORB 20A returns the reply buffer back to the proxy object 18, which unmarshals inout and out parameters and the return value (or a raised exception), and returns these to the client application code 16.

At the server 14 side, the ORB 20B runs a thread in an event loop that waits for incoming requests. When the request arrives from the client 12 the ORB 20B reads the request's binary buffer and passes this to some code that unmarshals the parameters and dispatches the request to the target servant 24. The code that performs the unmarshalling and dispatching is spread over two components, the Portable Object Adapter (POA) (shown in FIG. 1) and the skeleton code that is generated by the IDL compiler. When the operation in the servant 24 returns, the skeleton code marshals the inout and out parameters (or a raised exception) into a binary buffer and this is returned via the POA 22 to the ORB 20B, which transmits the reply message across the network to the client process 12.

The main protocol for ORB communication as shown in FIG. 1 is the standardized General Inter-ORB Protocol (GIOP), which has been widely deployed for transport in the TCP/IP environment. GIOP also is described further in the aforementioned CORBA Specification, and as of this writing is a version 1.3. GIOP over TCP/IP is known as Internet Inter-ORB Protocol (IIOP). GIOP is a client-server protocol and defines the messages and format that are passed over the ORB between the client and the server object. The data placed in the GIOP follows CORBA Common Data Representation (CDR) syntax for placing and copying the data into an octet stream. CORBA is mainly used on General Purpose Processors (GPPs) using TCP/IP and/or OS Inter-Processor Communications (e.g., shared memory).

There is increasing need to apply technology such as the CORBA GIOP ORB in different types of environments, but some environments, especially embedded environments, require more efficient and/or compact messaging than is provided via the GIOP message and GIOP header formats of FIG. 2. In addition, standard GIOP/IIOP interoperability protocols can be less than optimal for applications having strict requirements for latency, overhead and message sizes. Furthermore, because the CORBA GIOP was originally developed for use in general purpose distributed computing environments, optimization of the GIOP may be required for the best performance in distributed embedded systems, which can be more complex, especially because of the many interfaces with different types of control devices and input/output (I/O) devices. Optimized interoperability protocols are thus becoming of greater importance.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

CORBA and its GIOP initially were designed for non-embedded environments. One issue with at least some known implementations of the aforementioned implementations is that for certain types of systems such as embedded constrained systems, the CORBA GIOP message headers are too large, which can result in inefficiencies and assurance issues. For example, for command and control type interface operations the GIOP header takes up at least 80% or more of the message size. Also, from an assurance standpoint it can be harder to verify that the information in the GIOP message headers is valid. In addition, the inventor of the instant application has found that, from an assurance stand point, not all of the types of CORBA GIOP messages need be supported in all types of environments. For example, in certain embedded environments, such as the Software Defined Radio (SDR), Request and Reply types of messages are the primary messages being used. Robotics is another example of an embedded environment that often does not require all types of CORBA GIOP messages.

There have been attempts to create customized or optimized protocols using certain subsets of the message types. One version, called nORB modifies the GIOP message format slightly by removing the service context field and supports only a subset GIOP messages: request, reply, locate request and locate reply messages. Another solution, referred to as GIOPLite, is a so-called "lightweight GIOP" that proposes to optimize GIOP by removing certain fields from the GIOP header in an effort to improve performance. Removal of these fields from the GIOP header and GIOP request header theoretically should reduce the GIOP message footprint overhead. GIOPLite removes the following fields: Magic number, Version, Byte order flag, Request service context, and Request principal. Still another approach is the so-called Controller Area Network (CAN) approach, which its developers also refer to as Embedded IOP (EIOP), because it is an IOP that can be used in an embedded environment. CAN supports only the message types Request and Request Cancel, and has its own header definition for Request messages, which the header definition does not retain CORBA fields. In addition, the known attempts to create these types of subset protocols do not provide ORB support and none of the known approaches retains all the CORBA GIOP features with a reduced header definition.

Note that "Embedded IOP", also referred to as "EIOP", is a generic term that describe more than one variant or implementation of an embedded IOP, and mere fact that the CAN implementation also is referred to as an EIOP, and that in some instances the present invention also is referred to as an EIOP, does not mean that they are identical as is further explained herein.

In one embodiment, the invention provides systems and methods for providing an optimized inter-ORB protocol (IOP), which is referred to herein both as the custom Inter-ORB Protocol (custom-IOP) and also, in certain embodiments, the Embedded Inter-ORB Protocol (EIOP), that supports all the fields in the CORBA GIOP, but which takes up significantly less bytes than the GIOP (that is, the custom-IOP (e.g., EIOP) described herein is an exemplary, but in no way limiting). In this embodiment, only the GIOP Request and Reply message types need be supported and are defined to be a small as possible and still support the CORBA features, giving better performance and throughput, reduced latency and better information assurance (as is well understood, sending less data improves information assurance). The CORBA Common Data Representation (CDR) is still supported. In a further embodiment, the custom-IOP IDL provides the capability by IDL compile directives of supporting either the minimum custom-IOP definition (request and reply messages with object key only), which is also referred to herein as "lightweight custom-IOP" or "lightweight EIOP," or a "full" custom-IOP (or EIOP) that supports all the GIOP features such as different addressing disposition (IOR, profile), all addressing modes (addressing, disposition) and all GIOP message types. In addition, in this embodiment, an interface definition language (IDL) compiler option provides an indicator as to whether GIOP and custom-IOP code is generated to eliminate, at run-time, checking which type of IOP is supported.

In one embodiment, the invention comprises a non-transient computer-readable storage medium storing computer program code that, when loaded into a computer system and executed thereon, causes the computer to:

(a) compile an interface definition language (IDL) configured to provide a custom inter-orb protocol (custom IOP);

(b) configure a message header for a message in accordance with to a specification in the IDL for at least a custom-IOP message header, wherein:

(b-1) prior to compiling the IDL, the computer is configured to process a set of indicators defining certain features of the custom-IOP applicable to the custom-IOP message header and applicable to the message sent in accordance with the custom-IOP, the set of indicators comprising at least a first indicator defining the size of the message in the custom-IOP, the size of the message comprising one of a first message size and a second message size; and (b-2) the computer configures the custom-IOP message header to be in compliance with and convey equivalent information to the Common Object Resource Broker Architecture (CORBA) General Inter-Orb (GIOP) protocol and the corresponding respective GIOP message header; and (c) define a custom-IOP message header to replace the corresponding GIOP message header, wherein the custom-IOP message header requires fewer bits overall than the corresponding GIOP message header by changing or eliminating at least a portion of the fields in the corresponding GIOP message header, including at least:

(c-1) eliminating the 4 byte (32 bit) GIOP magic number identifier field;

(c-2-) replacing the eight (8) bit GIOP flags field with a custom-IOP flags field having four (4) bits, the four bits comprising a one (1) bit in-use indicator field, a one (1) bit endian indicator field, a one (1) bit service context indicator field, a one (1) bit spare field;

(c-3) replacing the eight (8) bit GIOP message type field with a custom-IOP message type field having 4 bits; and (c-3) reducing the size of the message length field from four (4) bytes to two (2) bytes.

Advantageously, in one embodiment, the non-transient computer-readable storage medium is constructed and arranged to operate in a predetermined environment comprising a client and server that send and receive messages only in accordance with the custom IOP. For example, in one embodiment, the predetermined environment comprises an embedded client-server system, such that the custom-IOP comprises an embedded-IOP (EIOP). In addition, in a further embodiment, the computer program code further cause the computer to allow octet types as a discriminate value for a union.

In a further embodiment, the modified custom-IOP message header, in combination with the set of indicators and the predetermined environment, is configured to convey the same information as the GIOP message header but using fewer bits than the GIOP message header. In a still further embodiment, the computer program code further causes the computer to change the GIOP unbounded sequence marshaling rules for EIOP message headers. In a still further embodiment, the custom-IOP uses an octet addressing type.

In still another embodiment, the custom-IOP is assigned a version, the version assigned by one of the following steps: providing a version in a version number field in the custom-IOP message header; receiving, at a time of compiling the computer program code, information indicating the version of the custom-IOP; and assuming, if no version is indicated in the version number field and no version number is received at time of compiling, that the version corresponds to a default version. Dependent on the version, in one embodiment, the set of indicators further comprises a second indicator defining which CORBA GIOP message types are supported in the custom-IOP. In addition, dependent on the version and value of the second indicator, in one embodiment, the size of the GIOP message header is selected to accommodate the number of CORBA GIOP message types that are supported. For example, in one embodiment, the second indicator designates that all CORBA GIOP message types are supported in the custom-IOP. In another example, in one embodiment, dependent on the version, the set of indicators further comprises a third indicator defining a type of GIOP addressing disposition that is supported for supported in the custom-IOP. In a further embodiment, dependent on the version, the spare bit in the custom-IOP header is defined to be an indicator designating whether or not a fragment is present.

In still another embodiment, the program code further causes the computer to specify in the IDL a custom-IOP request header, where the custom-IOP request header is defined to replace the corresponding GIOP message header, wherein the custom-IOP request header requires fewer bits overall than the corresponding GIOP request header by changing or eliminating at least a portion of the fields in the corresponding GIOP request header, including at least:
  (e-1) replacing the 4 bytes (32 bits) Request ID field and 4 bytes (32 bits) Response flags field with a custom 2 bytes (16 bits) Request field, wherein the three most significant bits (MSB) of the custom Request field are defined to be a three (3) bits custom Response flags field, and the remaining thirteen (13) bits are defined to be a Request ID field;
  (e-2) replacing the 2 byte (16 bit) Target field with a 1 byte (8 bits) custom Target Addressing Disposition field, wherein the Target Addressing Disposition Field is sized to be sufficient to designate all addressing disposition modes that are used;
  (e-3) replacing the unbounded Operation Name field with a 1 byte (8 bits) fixed size custom Operation Name field; and
  (e-4) removing the 4 bytes (32 bits) Operation Name length field.

For example, in one embodiment, if a custom-IOP request header is specified and if the setting of the service context indicator field is set to indicate the presence of service context information, the program code further causes the computer to:
  (e-7) replace the 4 bytes (32 bits) Number of Service Contexts field with a 1 byte (8 bits) custom Number of Service Contexts field;
  (e-8) replace the 4 bytes (32 bits) Service Context ID field with a 1 byte (8 bits) custom Service Context ID field; and
  (e-9) replace the 4 bytes (32 bits) Service Context Length field with a 1 bytes (8 bits) custom Service Context Length field.

In still a further embodiment, if a custom-IOP request header is specified and if the custom-IOP further comprises a version number field and if the version specified in the version number field corresponds to a first predetermined version, then the program code further causes the computer to:
  (e-5) remove the 4 bytes (32 bits) length of object key field and
  (e-6) define a custom-IOP target object key comprising a fixed-size object key, the fixed-size of the custom-IOP object key being a size configured to accommodate the maximum possible number of objects allowed by a portable object adapter (POA) in an embedded client-server system.

For example, in one further embodiment, the maximum possible number of objects comprises 256 objects and the fixed-size object key has a size of two-bytes.

In still a further embodiment, if a custom-IOP request header is specified and if the custom-IOP further comprises a version number field and if the version specified in the version number field corresponds to a second predetermined version, the program code further causes the computer to:
  (e-7) replace the 4 bytes (32 bits) length of object key field with a 1 byte (8 bits) custom length object key field; and
  (e-8) define a custom-IOP target object key that comprises one of an EIOP::ObjectKey and an IOP::ObjectKey.

In still a further embodiment, if a custom-IOP request header is specified and if the custom-IOP further comprises a version number field and if the version specified in the version number field corresponds to a third predetermined version, the program code further causes the computer to:
  (e-9) replace the 4 bytes (32 bits) length of object key field with a 1 byte (8 bits) custom length object key field; and
  (e-10) define a custom-IOP target object key that is configured to support profile and reference addressing and which comprises one of an EIOP::ObjectKey, an IOP::ObjectKey, an IOP::TaggedProfile, and IORAddressingInfo.

In a further embodiment, if a custom-IOP request header is specified, the program code further causes the computer to:
  (e-10) modify the CORBA marshaling rule for sequence types associated with request messages, by changing a corresponding string and sequence type from an unsigned long having a size of four (4) bytes to an octet type having a size of one (1) byte; and
  (e-11) basing, for a given sequence associated with a request message, the size and alignment requirements on an unbounded sequence index type.

In still a further embodiment, the program code further causes the computer to specify in the IDL a custom-IOP reply header, where the custom-IOP reply header is defined to replace the corresponding GIOP message header, wherein the custom-IOP reply header requires fewer bits overall than the corresponding GIOP reply header by changing or eliminating at least a portion of the fields in the corresponding GIOP request header, including at least replacing the 4 bytes (32 bits) Request ID field and 4 bytes (32 bits) Reply status field with a custom 2 bytes (16 bits) Reply field, wherein the three most significant bits (MSB) of the custom Reply field are defined to be a three (3) bits custom Reply status field, and the remaining thirteen (13) bits are defined to be a Request ID field. In a further embodiment, if a custom-IOP reply header is defined and if the setting of the service context indicator field is set to indicate the presence of service context information, the program code further causes the computer to:
  (g-2) replace the 4 bytes (32 bits) Number of Service Contexts field with a 1 byte (8 bits) custom Number of Service Contexts field;
  (g-3) replace the 4 bytes (32 bits) Service Context ID field with a 1 byte (8 bits) custom Service Context ID field; and
  (g-4) replace the 4 bytes (32 bits) Service Context Length field with a 1 byte (8 bits) custom Service Context Length field.

In a still further embodiment, if the custom-IOP reply header is defined, the program code further causes the computer to:
  (g-5) modify the CORBA marshaling rule for sequence types associated with reply messages, by changing a corresponding string and sequence type from an unsigned long having a size of four (4) bytes to an octet type having a size of one (1) byte; and (g-6) basing, for a given sequence associated with a reply message, the size and alignment requirements on an unbounded sequence index type.

In still another embodiment, the program code further causes the computer to:

(h) specify in the IDL a custom IOP Cancel Header; and (i) define the custom-IOP cancel header to replace the corresponding GIOP cancel header, wherein the custom-IOP cancel header requires fewer bits overall than the corresponding GIOP cancel header by changing or eliminating at least a portion of the field in the corresponding GIOP cancel header, including at least replacing the 4 bytes (32 bits)

Request ID field with a custom 2 bytes (13 bits) Request ID field.

In a still further embodiment, the program code further causes the computer to:

(j) specify in the IDL a custom IOP LocateRequest Header;

(k) define the custom-IOP LocateRequest header to replace the corresponding GIOP LocateRequest header, wherein the custom-IOP LocateRequest header is configured to support at least one of a custom Target Addressing Disposition field, custom-IOP target object key, EIOP::ObjectKey, IOP::ObjectKey, custom-IOP target object key, IOP::TaggedProfile, IORAddressingInfo, and wherein the custom-IOP LocateRequest header is configured to require fewer bits overall than the corresponding GIOP LocateRequest header by changing or eliminating at least a portion of the field in the corresponding GIOP LocateRequest header, including at least:

(k-1) replacing the 4 byte (32 bits) Request ID field with a custom 2 byte (13 bits) Request ID field;

(k-2) replacing the 2 byte (16 bits) Addressing Disposition field with a custom 1 byte (8 bits) Addressing Disposition field capable of representing all addressing disposition modes;

(k-3) if the version corresponds to a first predetermined version having a fixed size object key, then eliminating the 4 byte (32 bits) Length of Object Key field, reducing the size of the an unbounded Object key field to 2 bytes (16 bits), and defining a custom-IOP target object key comprising a fixed-size object key, the fixed-size of the custom-IOP object key being a size configured to accommodate the maximum possible number of objects allowed by a portable object adapter (POA) in an embedded client-server system;

(k-4) if the version specified in the version number field corresponds to a second predetermined version, the program code further causes the computer to replace the 4 bytes (32 bits) length of object key field with a 1 byte (8 bits) custom length object key field, and define a custom-IOP target object key that comprises one of an EIOP::ObjectKey and an IOP::ObjectKey; and (k-5) if the version specified in the version number field corresponds to a third predetermined version, the program code further causes the computer to replace the 4 bytes (32 bits) length of object key field with a 1 byte (8 bits) custom length object key field, and define a custom-IOP target object key that is configured to support profile and reference addressing and which comprises one of an EIOP::ObjectKey, an IOP::ObjectKey, an IOP::TaggedProfile, and IORAddressingInfo.

In yet another embodiment, the program code further causes the computer to:

(l) specify in the IDL a custom IOP LocateReply Header;

(m) define the custom-IOP LocateReplyheader to replace the corresponding GIOP LocateReply header, wherein the custom-IOP LocateReply header requires fewer bits overall than the corresponding GIOP LocateReply header by changing or eliminating at least a portion of the fields in the corresponding GIOP LocateReply header, including at least:

(m-1) replacing the 4 bytes (32 bits) Request ID field with a custom 2 bytes (13 bits) Request ID field; and (m-2) using the 3 bits Response Flags field of the custom-IOP request header to provide the information corresponding to the LocateStatus field; and (m-3) eliminating the 4 bytes (32 bits) LocateStatus field.

In another embodiment, the program code further causes the computer to:

(n) specify in the IDL a custom IOP Fragment header; and (o) define the custom-IOP Fragment header to replace the corresponding GIOP Fragment header, wherein the custom-IOP Fragment header requires fewer bits overall than the corresponding Fragment header by changing or eliminating at least a portion of the fields in the corresponding GIOP Fragment header, including at least replacing the 4 bytes (32 bits) Request ID field with a custom 2 bytes (13 bits) Request ID field.

Furthermore, the architectures and methods which are the subject of this disclosure can be used in conjunction with (and/or adapted to work with) many different types of embedded environments, including but not limited to the Software Communications Architecture (SCA) for Software Defined Radio's (SDRs), both the existing 2.2/2.2.2. Specification and future Specifications (e.g., SCA Next and beyond), all of which are hereby incorporated by reference. It is anticipated that at least some of the architectures and methods of this disclosure also are applicable to systems and devices that use software components to communicate with different waveforms or protocols/standards, such as mobile/cellular telephones and other wireless network devices. It is further anticipated that at least some of the architectures and/or methods of this invention are applicable to other technologies and/or domains that require a lightweight deployment and configuration infrastructure, as well as any application that is using CORBA internally.

Details relating to this and other embodiments of the invention are described more fully herein.

BRIEF DESCRIPTION OF THE FIGURES

The advantages and aspects of the present invention will be more fully understood in conjunction with the following detailed description and accompanying drawings, wherein:

FIG. 7 is a table comparing the EIOP Message Header Version 1 of FIG. 6A and the EIOP Message Header Version 2 of FIG. 6B with the GIOP Message Header;

FIG. 10 is a table comparing the EIOP Request Headers of FIGS. 8 and 9 and of other embodiments of the invention with the GIOP Request Header;

FIG. 13 is a table comparing the EIOP Reply of FIGS. 11 and 12 with the GIOP Reply;

FIG. 14 is a table comparing the EIOP cancel request with the GIOP cancel request;

FIG. 15 is a table comparing the EIOP locate request with the GIOP locate request;

FIG. 16 is a table comparing the EIOP locate reply with the GIOP locate reply;

FIG. 17 is a table comparing the EIOP fragment with the GIOP fragment;

FIGS. 18A-18F are a listing of a CORBA pseudo-IDL (PIDL) that maps to the EIOP Message Headers of FIGS. 6-11.

Figure 1:
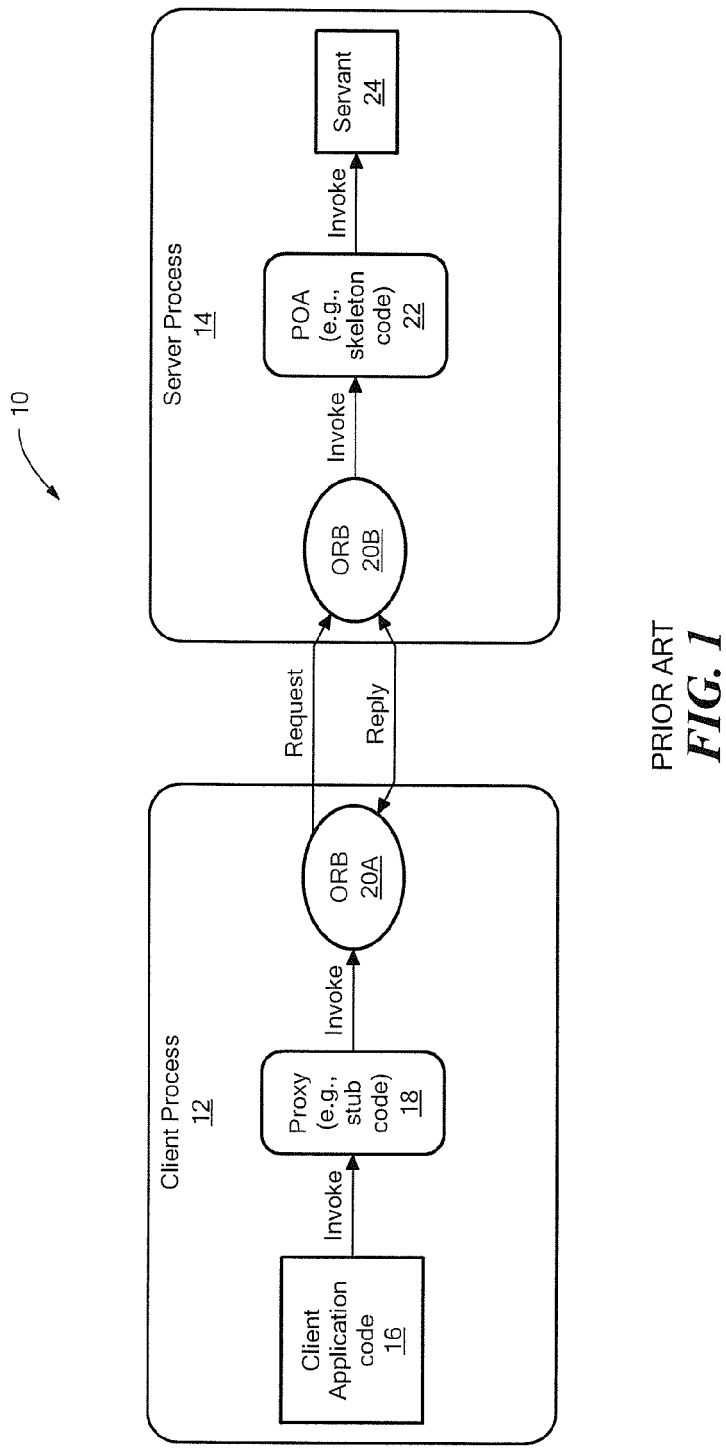
FIG. 1 is a block diagram of a prior art CORBA client-server system.

The drawings are not necessarily to scale, emphasis instead generally being placed upon illustrating the principles of the invention.

DETAILED DESCRIPTION

It should be understood that, in the following detailed description, detailed explanations are not provided in every instance for terms of art that can be located and explained in the aforementioned and incorporated-by-reference CORBA specifications. In addition, in the following discussion, for clarity of description, exemplary listings of actual code used, in accordance with one embodiment of the invention, to implement the various interfaces (e.g., the interface definition language (IDL)), is not provided as part of the body of the text. Rather, such code listings are provided as part of the Figures.

Before detailing the illustrative embodiments of the custom-IOP of the invention (e.g., the Embedded Inter-Orb Protocol (EIOP) of the invention), including detailed message headers and message formats unique to this custom-IOP, it is helpful, in showing the advantages provided by at least some embodiments of the invention, to contrast the disclosed embodiment with the existing, prior art CORBA GIOP 1.3 protocol, especially with respect to Request and Reply message types.

The OMG's GIOP 1.3 specification includes standards for messaging, data, and object referencing. Its messaging standard defines features such as packet headers, protocols for remote communication, and requirements on the underlying transport service. Its data standard, called the Common Data Representation (CDR) standard, defines encodings for primitive and structured data-types in messages. Its object referencing standard defines the structure and content of Interoperable Object References (IORs), which serve as location transparent object identifiers. The CORBA GIOP messaging standard defines eight different message types, as shown in Table 1. Note that, in accordance with GIOP version 1.3, if bidirectional GIOP is in use for GIOP protocol, either side (client or server) may originate messages.

TABLE 1

CORBA GIOP Message Types

| Message Type | Originator | Function |
| --- | --- | --- |
| Request | Client (or Both, if bi-directional GIOP) | Carry information necessary to invoke a remote object; sent to invoke the remote method |
| Reply | Server (or both, if bidirectional GIOP) | Returned in response to Request. It normally contains the data, returned from the remote method. In other cases the reply may contain the redirection instruction or the description of the exception that was thrown on a server side. |
| CancelRequest | Client (or both, if bidirectional GIOP) | Advises servers that a reply is no longer required for a still-pending request whose identifier is specified in the message (no longer waiting for the answer). |
| LocateRequest | Client (or both, if bidirectional GIOP) | Query Current Location of an object; verifies that the server knows and supports the certain remote object, and (if not), to what address the requests for that object should be sent instead. |
| LocateReply | Server (or both, if bidirectional GIOP) | Sent in response to LocateRequest message; if needed, it may contain the new address of the remote object that has moved. |
| CloseConnection | Server (or both, if bidirectional GIOP) | Advises client not to send further requests on the connection on which the CloseConnection message was received; server indicates that it will not provide the future responses |
| MessageError | Client or Server | Sent in response to any message with a bad header, e.g., a malformed or otherwise invalid messages; not used to report errors outside the messaging system; such errors are reported using the Reply message |
| Fragment | Client or Server | A subsequent message, continuing the previous one; long messages can be split into fragments. Supports multi-fragment messages and follows an incomplete preceding message (of type Request, Reply, LocateRequest, LocateReply or Fragment) which has its "following fragment" bit set. |

Figure 2:
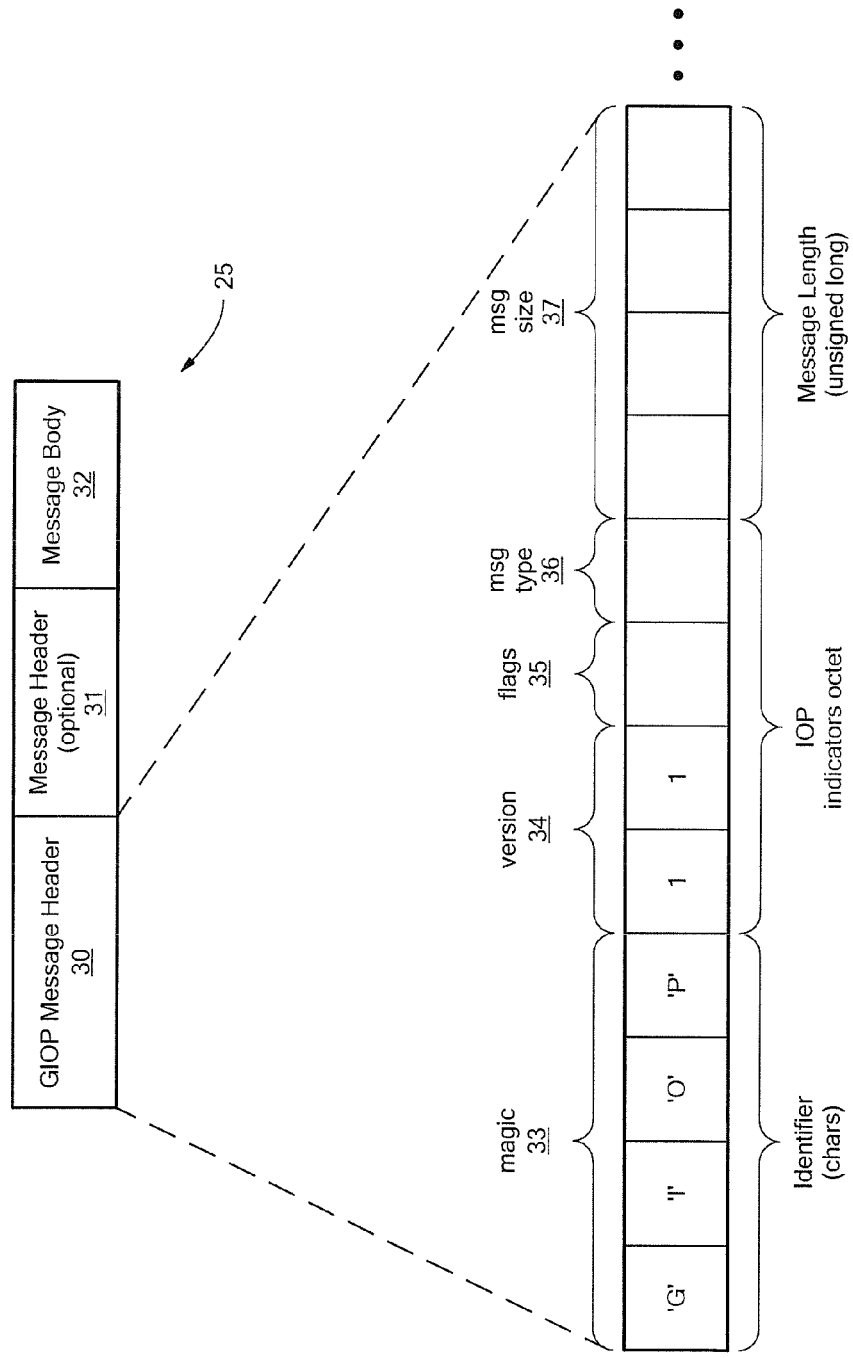
FIG. 2 is a block diagram of a prior art CORBA GIOP message header.

In addition, per the CORBA standard, all of the GIOP message types shown in Table 1 presently use a fixed-size message header. FIG. 2 is an illustration of an exemplary prior art GIOP message format 25 and prior art message header format 30. In addition, the table of FIG. 7 (which is a table comparing the GIOP message header with the exemplary custom-IOP message headers (which in this example are EIOP message headers) of several embodiments of the invention, all described further herein) also provides information about the GIOP message header. Referring to FIGS. 2 and 7, the GIOP message format 25 is a generic format of a message in accordance with the GIOP, the generic GIOP message 25 includes a GIOP message header 30, the optional message header 31 (where the optional message header 31 is specific to the particular message type—the Request, Reply, CancelRequest, LocateRequest, and LocateReply message types include this message specific header 31 located in between the message header (of FIG. 2) and the payload of the message, but the message header is not provided with other types), and message body 32.

Referring still to FIG. 2, the prior art GIOP message header 30 is a 12 byte (96 bit) header common to all messages). The GIOP message header 30 includes several fields, as shown in FIG. 2. The magic field 33 (also referred to as magic number field 33 or GIOP identifier), has a size of 4 bytes (i.e., 4 octets or 32 bits) and identifies a message as being a GIOP message. In GIOP, the value of the magic field 33 always is set to the four upper case characters "GIOP", encoded in ISO Latin-1. As noted in the table of FIG. 7, the illustrated embodiments of the invention for custom-IOP eliminate this IOP identifier entirely, helping to reduce the size of the header. This magic field 33 portion of the message header 30 can be eliminated, as is done in the embodiments of the invention, for a number of reasons. For example, in a given embedded context, it may be known that all messages are going to be messages sent in accordance with the given custom IOP protocol (e.g., the EIOP protocol, in an embedded environment), so it is not necessary to further add a header specifically indicating this—such a header would be redundant.

Referring again to FIGS. 2 and 7, the next 4 bytes include the version field 34, the flags field 35, and the message type field 36, which together form a set of GIOP indicators. The GIOP_version field 34 is two octets, and the flags field 35 and message type field 36 are each an octet (1 byte or 8 bits) in size. The GIOP version field 34 contains the version number of the GIOP protocol being used in the message (in this example of FIG. 2, the major GIOP version number is 1 and the minor GIOP version number also is 1, showing GIOP version 1.1 (the minor could be one of 0, 1, or 2), but this is not, of course, limiting. Note, also, that GIOP message headers are the same as illustrated in FIG. 2 for GIOP 1.2 and 1.3. In the examples described herein, the difference between the three described minor versions (i.e., 0, 1, and 2) is the addressing mode that is supported. The flags field 35 is an eight-bit octet, where the least significant bit (LSB) indicates the byte ordering used in subsequent elements of the message (including message size), the second LSB indicates whether or not more fragments follow, and the most significant 6 bits are reserved, but set to 0 for GIOP 1.3. The message_type field 36 indicates the type of the message. The message_size field 37 (also referred to as message length) contains the number of octets in the message following the message header, encoded using the byte order specified in the byte order bit (the least significant bit) in the flags field 35, excluding the 12 octets of the fixed-size message header itself. For GIOP 1.3, if the second LSB of the flags field 35 is 1, the sum of the message_size field 37 value and 12 must be evenly divisible by 8. The message_size field 37 is itself 4 bytes in length.

Figure 3:
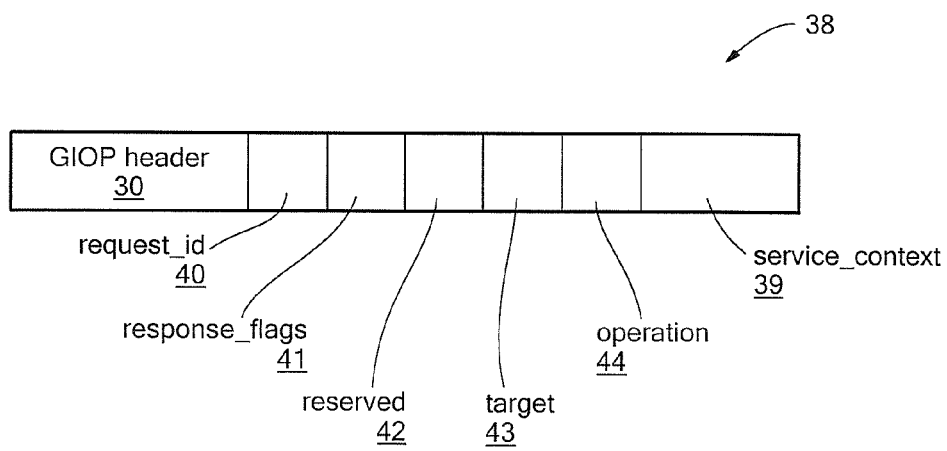
FIG. 3 is a block diagram of a prior art CORBA GIOP request message header.
Figure 4:
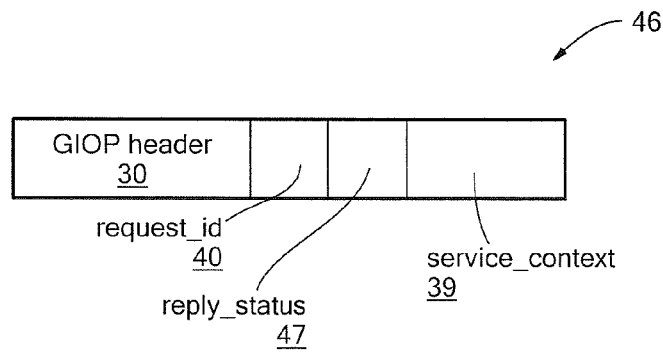
FIG. 4 is a block diagram of a prior art CORBA GIOP reply message header.

Each message type in Table 1 also has its own format for its respective message header 31, as explained further in the aforementioned CORBA Specification. Two illustrative examples of prior art messages are shown in FIGS. 3 and 4, and one of skill in the art will appreciate that similar examples of message headers for the other message types can be created in accordance with the CORBA Specification. FIG. 3 is a block diagram of a prior art CORBA GIOP 1.2/1.3 request message header 38, and FIG. 4 is a block diagram of a prior art CORBA GIOP 1.2/1.3 reply message header 46. These prior art request and reply messages of FIGS. 3 and 4 are different from the custom-IOP request and reply messages of the embodiments described further herein, in connection with the embodiments of the invention described herein. This is also explained further herein in connection with the table of FIG. 10, which is a table comparing the custom-IOP (e.g., EIOP) Request Headers of certain embodiments of the invention (described further herein in connection with FIGS. 8 and 9) and of other embodiments of the invention with the custom-IOP (e.g., EIOP) Request Header.

Referring to FIGS. 1-3, the prior art request message header 38 is part of the Request message of Table 1. A Request message (header 38 plus message body 32) allows the client application 16 to invoke an operation on a remote server/servant 24. The request message header 38 contains all the information which is needed for the invocation including the identity of the object, the operation name, and any parameters associated with the operation. Request messages are used to invoke operations which have been declared in an IDL interface, thus, the message format of the Request message is configured to support all of the syntax which can appear in an IDL operation definition.

Figure 8:
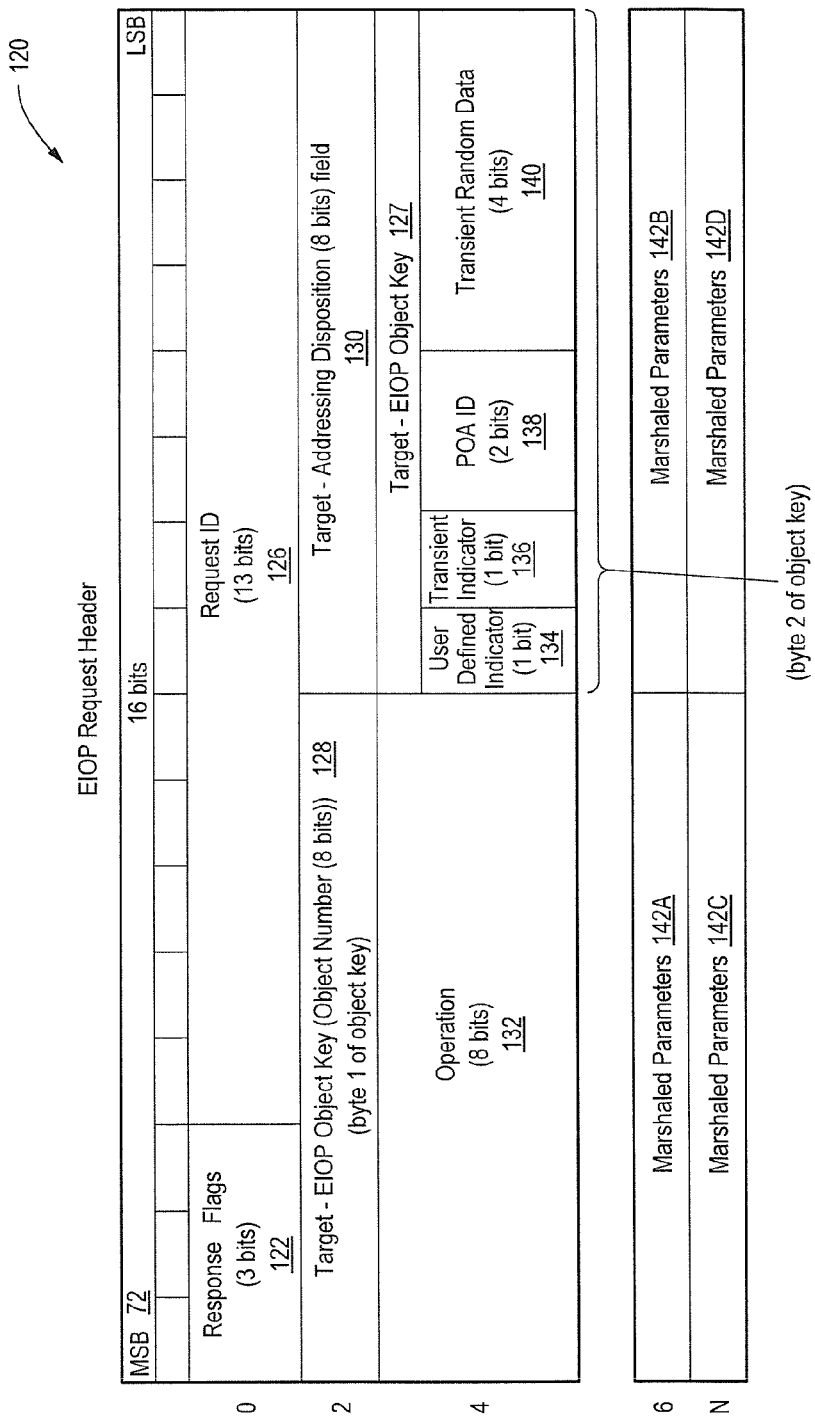
FIG. 8 is a diagram of an EIOP Request Header, in accordance with one embodiment of the invention.
Figure 9:
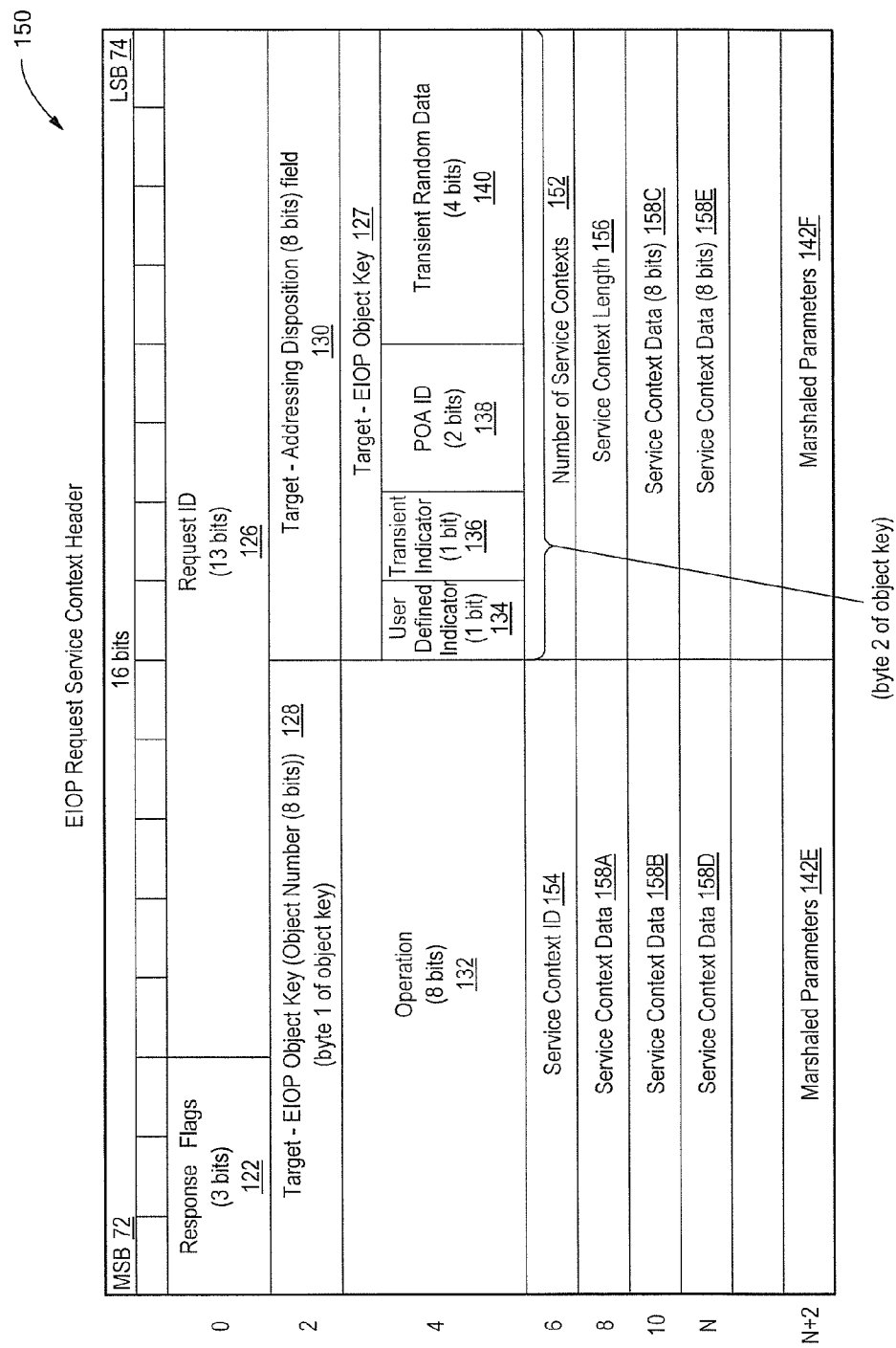
FIG. 9 is a diagram of an EIOP Request Service Context Header, in accordance with one embodiment of the invention.

Referring to FIG. 3, the prior art GIOP request_id field 40 is a 4-bytes (32 bits) field that is used to associate reply messages with request messages. In contrast, in the embodiments of the custom-IOP described further herein (e.g., in FIGS. 8 and 9), the entire request_id field 40 is reduced to 2 bytes (16 bits) total, which includes a 3 bits "Response Flags" field 122 and a 13 bits Request ID field 126, as shown in FIGS. 8 and 9, described further below. Referring again to FIG. 3, the response_flags field 41 (referred to as the "Response flags" field in GIOP 1.0 and 1.1) is 4 bytes in length, and is set to 0x0 for a SyncScope of NONE and WITH_TRANSPORT. The flag is set to 0x1 for a SyncScope of WITH_SERVER. A non exception reply to a request message containing a response_flags value of 0x1 should contain an empty body, i.e. the equivalent of a void operation with no out/inout parameters. The flag is set to 0x3 for a SyncScope of WITH_TARGET. These values ensure interworking compatibility between this and previous versions of GIOP. Note that, in the embodiments of the invention described herein in connection with the custom-IOP, the response flags field 41 is no longer a separate field; instead, response flags is instead a 3 bits part of the "request ID" field (see, e.g., FIGS. 8 and 9 described further herein), thereby saving these bytes in the message length. The reserved field 42 (which in GIOP 1.1 is an array of three bytes/octets) is set to 0 in GIOP 1.1

The target field 43 is a two bytes (16 bits) GIOP field that identifies the object that is the target of the invocation (in GIOP 1.0 and 1.1 the field that performs part of this function is the object_key field). As FIGS. 8 and 9 show and as the table of FIG. 10 shows, in the described embodiments of the custom-IOP, the target/addressing disposition field is reduced to one byte that is capable of representing all addressing disposition modes.

Figure 11:
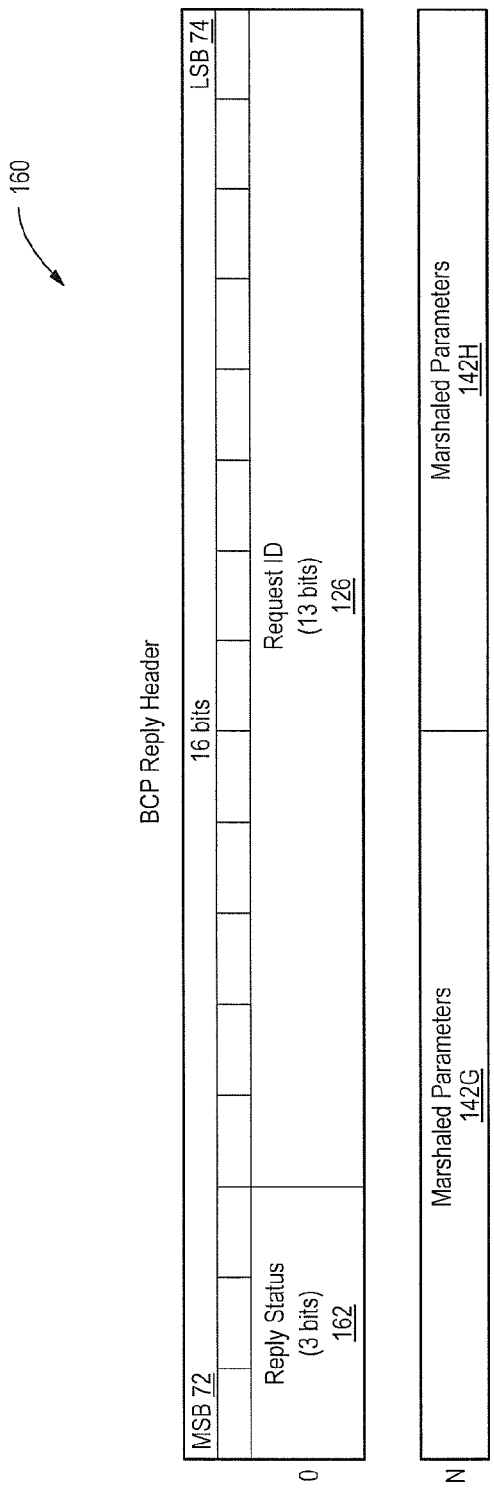
FIG. 11 is a diagram of an EIOP Reply Header, in accordance with one embodiment of the invention.
Figure 12:
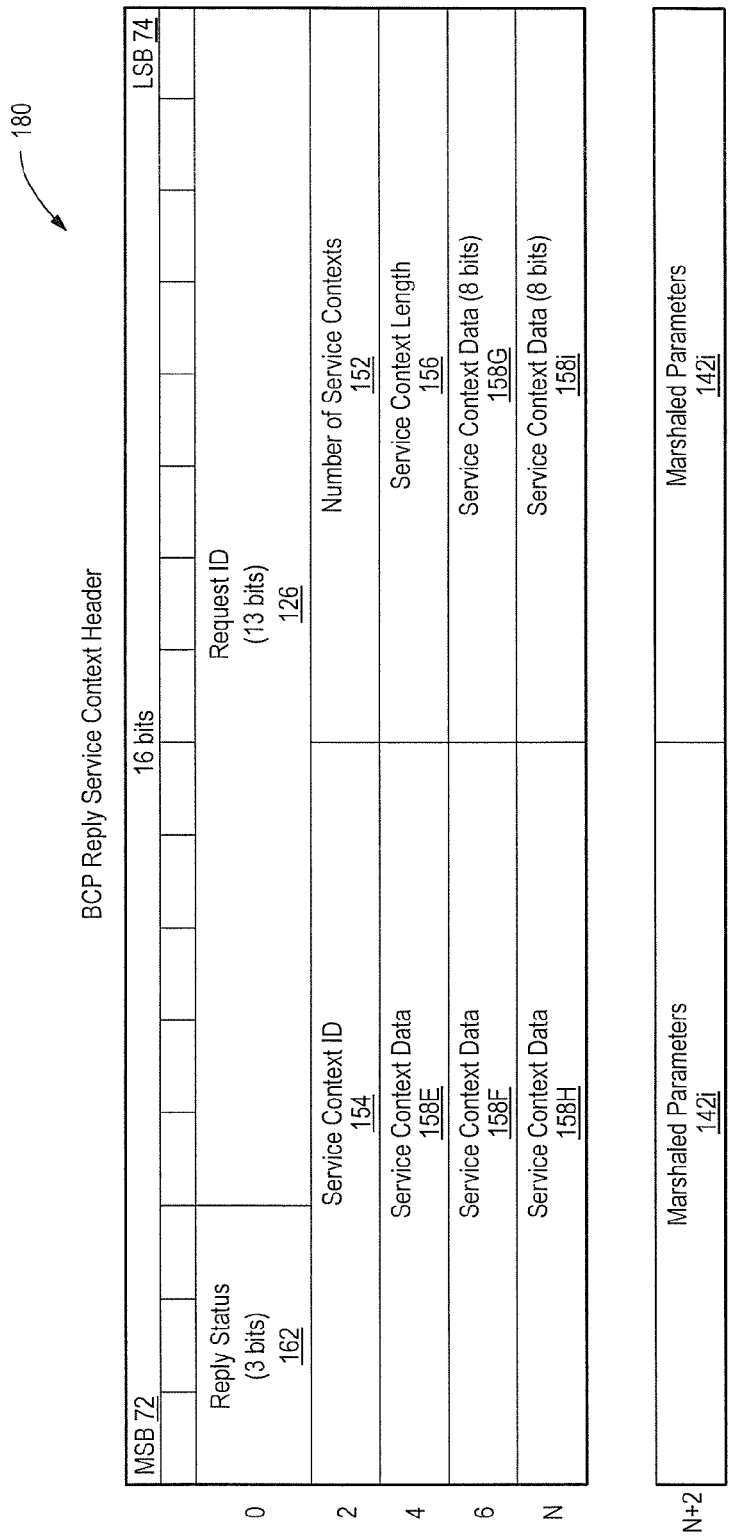
FIG. 12 is a diagram of an EIOP Reply Service Context Header, in accordance with one embodiment of the invention.

Referring again to FIG. 3, the prior art GIOP operation field 44 (also known as operation name field 44) is an IDL identifier naming, within the context of the interface, the operation being invoked. As noted in the table of FIG. 10, the size of the prior art GIOP operation field 44 is unbounded, but there is a minimum estimate of 10 bytes for the size of the operation field 44. In contrast, as shown in FIGS. 9 and 10, the operation field 132 of the embodiments of the invention is one byte in size and allows up to 256 operations per object. All Operation Name Length (length of operation name) field precedes the operation name. Also alignment padding of up to 3 bytes may occur after name for aligning on service context field 39. The service_context field 39 allows service specific context information to be passed along with a Request and is intended for use in conjunction with the CORBA services to carry extra information along with the Request; for example it contains ORB service data being passed from the client 12 to the server 14. As further described in section 7.7 of the incorporated-by reference CORBA interoperability specification, the service context field 39 can include information such as the number of service contexts (4 bytes), the service context ID (4 bytes) and service context length (4 bytes). In the GIOP, the service context length field is always required. In contrast, in the exemplary embodiments of the custom-IOP described further herein, the number of service contexts 152, service context length 156, service context ID 154, and service context data 158A-158I (see FIGS. 9 and 12) are only required when the service context indicator field 84 in the custom-IOP message header 70, 100 (see FIGS. 6A, 6B) is set to true. This is why the embodiments illustrated further herein include the request header without service context (FIG. 8) and the request header with service context (FIG. 9), as well as the reply headers without and with service context (FIGS. 11 and 12, respectively).

The message body 32 for the Request message, which is not specifically illustrated in FIGS. 2-3 but further described in the CORBA specification, includes of a list of the operation parameters followed by any context strings for the operation In the prior art GIOP implementation, reply messages (FIG. 4) are sent in response to Request messages only if the response flags field 41 in the Request message is set to \x03. Reply messages are intended is to pass back a return value for an operation in a Request and to indicate the completion status for the operation. The Reply message header 46 generally does not include as much information as the Request message header 38. Referring to FIG. 4, the Reply message header 46 includes a service context field 39, request-id field 40, and reply status field 47 (a Reply message body 32 also is included). The service_context field 39 is similar to the service_context field 39 of the Request message header 38 described above and contains ORB service data being passed from the server to the client, encoded. The request_id field 40 is used to associate replies with requests and contains the same request_id value as the corresponding request (i.e., the request_id is a unique (per client) identifier used to match Request and Reply). The reply_status field 47 indicates the completion status of the associated request, and also determines part of the reply body contents; the replay_status field 47 can indicate whether this is a normal Reply or if some error condition occurred in the server.

As will be explained below, the invention provides, in at least some embodiments, several implementations of a CORBA inter-orb protocol (referred to herein as the custom-IOP and, in particular embodiments, the "Embedded Inter-Orb Protocol" (EIOP)) that are optimized for embedded computing environments As is explained further herein, the embodiments of the invention support various possible versions of the custom-IOP, including at least one embodiment that provides support for all eight CORBA message types and at least one version that provides support for only the most commonly used message types in embedded environments. Further embodiments of the invention include 2 major versions of the custom-IOP, and each major version supports three minor versions. This is explained further below.

Before describing these embodiments, an overview is provided describing several types of computing environment in which the invention can be embodied. In particular, the CORBA protocols described herein can be implemented in many different types of various computing systems that include various combinations of known computing elements. In at least one embodiment, the invention can be implemented as part of an embedded computing system, such as a software defined radio (SDR) system. An SDR is a radio whose function is defined not by its underlying hardware, but instead by its software, such that its output signal is determined by software. SDR systems are thus reconfigurable, within the limits of the actual underlying hardware capabilities, by loading new software as required by a user.

Figure 5A:
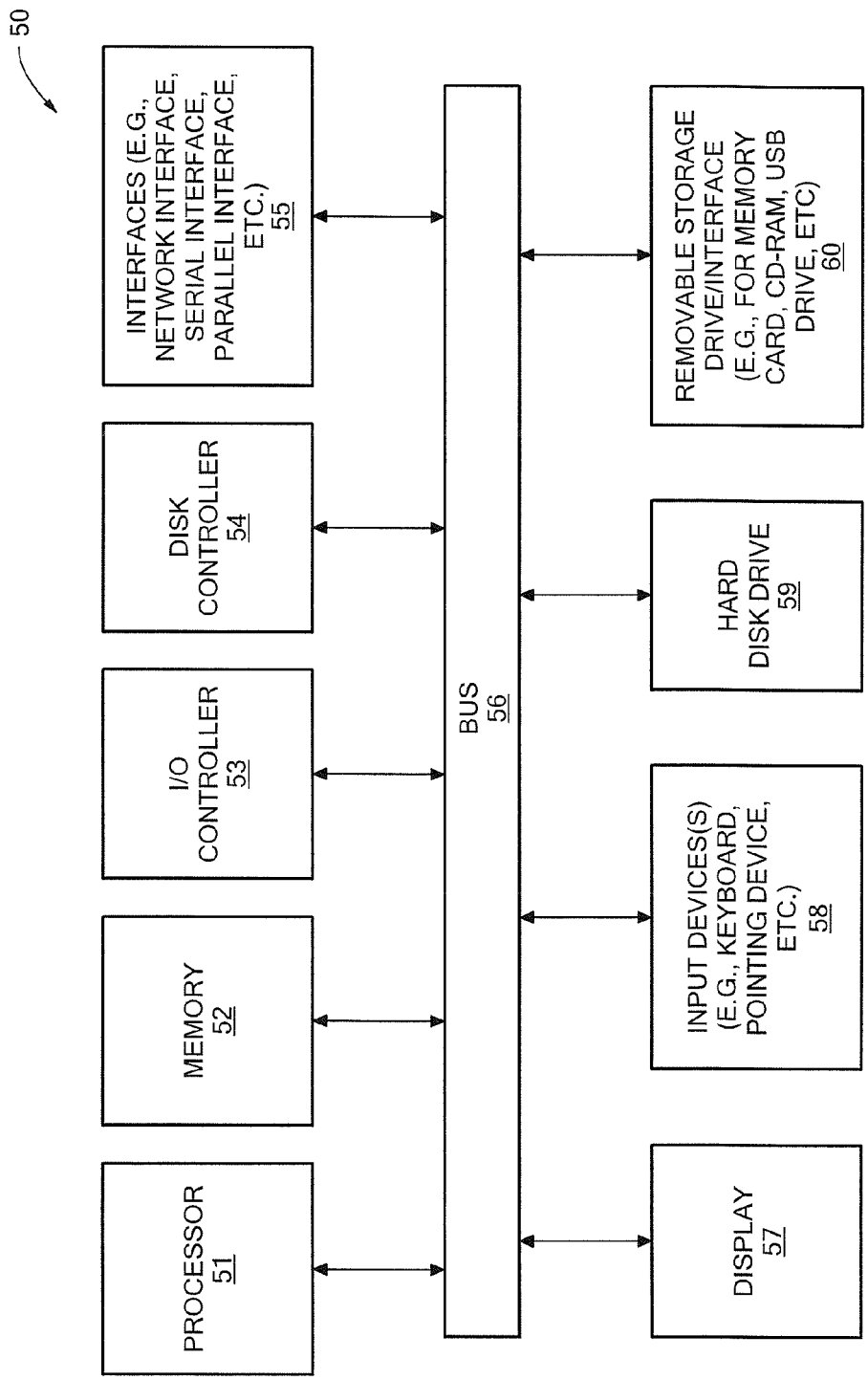
FIG. 5A is a block diagram of a prior art computer system in which at least one embodiment of the present invention can be embodied.
Figure 5B:
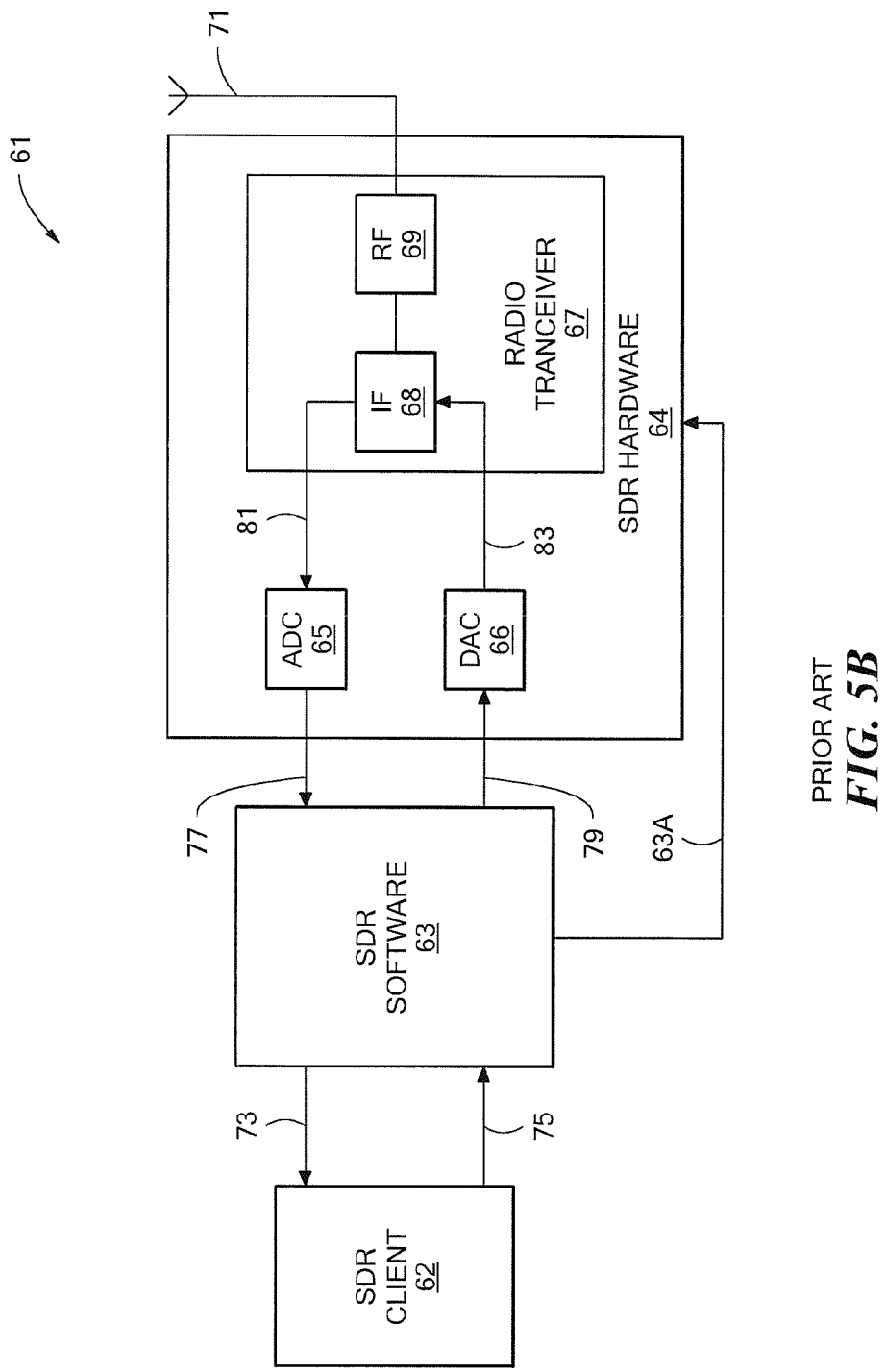
FIG. 5B is a block diagram of a prior art software defined radio (SDR) system in which at least one embodiment of the present invention can be used.

FIG. 5B is a block diagram of an exemplary prior art SDR system 61. The exemplary SDR system 61 includes a means for receiving an analog or digital radio waveform at a transmission frequency (e.g., an antenna 71 and associated hardware) along with an SDR hardware component 64, an SDR software component 63, and an SDR client 62.

The SDR hardware component 64 includes a radio receiver and/or radio transmitter (which is shown for illustrative purposes only in FIG. 5B as a radio transceiver 67), as well as an analog-to-digital (A/D) converter (ADC) 65 for conversion of the radio waveform 81 (also referred to as analog baseband input) is required) to a digital baseband input signal 77 to the SDR software c component 63, and a digital to analog (D/A) converter (DAC) 66, for D/A conversion of the digital baseband output 79 from the SDR software component 63. The radio transceiver 67 is a component well understood by those of skill in the art and includes, for example, a radio frequency (RF) subsystem 69 and an intermediate frequency (IF) subsystem 68. In the receiving mode, signals received by the antenna 71 are processed by the RF subsystem 69 and IF subsystem 68: for example, the signals received at antenna 71 can be processed in a tuner (to select the desired signal, such as by filtering), a detector (to extract audio signal from the signal selected by the tuner), downconverted to the desired baseband frequency, and then sent to the ADC 65 to be converted from an analog baseband signal 81 to a digital baseband data signal 77.

In the transmit mode, the digital baseband output signal 79 from the SDR software component 63 is sent to DAC 66 for conversion to an analog baseband output signal 83, the analog baseband output signal 83 is sent the IF subsystem 68 and RF subsystem 69 of the radio transceiver 67 of the basic SDR Hardware 64 for further processing, which may include upconverting the analog baseband output signal 83 to the appropriate transmission frequency, amplification, and filtering, then sent to antenna 71 for transmission.

The SDR software component 63 runs on a host, which can be a general-purpose computer system (such as described further herein in connection with FIG. 5A), or hardware that has been configured by software, such as a field-programmable gate array (FPGA), embedded computing device, multiprocessor embedded systems, any equivalent computing/processing circuit. A waveform can consist of a set of SDR software components executing on general purpose processors, FPGA's, digital signal processors, etc. The host is able to handle a considerable amount of the signal processing previously done by conventional radio hardware components such as mixers, filters, amplifiers, modulators/demodulators, detectors, etc. Thus, the SDR system 61 provides a radio that can receive and transmit widely different radio protocols (sometimes referred to as waveforms) based solely on the software used.

The SDR software component 63 is in operable communication with the SDR hardware component 64 via one or more data channels. For example, in FIG. 5B, the data channels include a first data channel 77 that permits reception of digital baseband input data from the ADC 65 of the SDR hardware component 64, a second data channel 79 that permits transmission of digital baseband output data from the SDR software component 63 to the SDR hardware component 64, and a control data channel 63A that permits transmission of control data from the SDR software component 63 to the SDR hardware component 64. The SDR software component 63 receives client input data 73 from an SDR client 62 and sends client output data 75 to the SDR client 62.

The digital baseband output 79 typically results from the SDR software component 63 performing a series of digital signal processing (DSP) functions necessary to prepare the client input data 73 from the SDR client 62 for transmission by the SDR hardware component 64. These functions may include: source encoding, encryption, error-correction coding, and baseband modulation, as well as the aforementioned functions performed by hardware components such as mixers, filters, amplifiers, modulators/demodulators, detectors, etc.

The SDR software component 63 of FIG. 5B, as noted above, as well as the SDR client 62, each can be implemented using a known computing system such as a general purpose computer. In accordance with at least some embodiments of the invention, the client and server can be on the same processor. In accordance with at least some other embodiments of the invention, the client and server can be on different processors, as is done with at least some embodiments of the SDR. An example of a multiple core processor architecture usable for embedded domains, such as those used for at least some embodiments of the invention, includes but is not limited to the OMAP architecture, available from Texas Instruments of Dallas, Tex.

FIG. 5A provides an illustration giving an overview of an exemplary computing system 50 usable with at least some embodiments of the invention. Note that systems and methods in accordance with the invention can be implemented using any type of computer system running any one or more types of operating systems. Exemplary types of computer systems on which at least some embodiments of the invention can be embodied include any system or device having a processor (or equivalent processing functionality) installed or embedded, including but not limited to a desktop computer, personal computer (PC), laptop computer, notebook computer, tablet computer, handheld computer, netbook, personal digital device (including but not limited to personal digital assistant (PDA), mobile communications device (including but not limited to radio, conventional telephone, mobile/cellular telephone, smart phone, music playing device, electronic reading device) server, workstation, and interconnected group of computers, as well as any other type of device having a microprocessor installed or embedded thereto, such as a field-programmable gate array (FPGA).

Referring now to FIG. 5A, FIG. 5A provides an illustration giving an overview of an exemplary computing system 50 usable with at least some embodiments of the invention. Note that systems and methods in accordance with the invention can be implemented using any type of computer system, included but not limited to embedded computing systems, enterprise computing systems, etc., running any one or more types of operating systems. Exemplary types of computer systems 50 on which at least some embodiments of the invention can be embodied include any system or device having a processor (or equivalent processing functionality, such as via a microcontroller) installed or embedded, including but not limited to a desktop computer, personal computer (PC), laptop computer, notebook computer, tablet computer, handheld computer, netbook, personal digital device (including but not limited to personal digital assistant (PDA), mobile communications device (including but not limited to radio, conventional telephone, mobile/cellular telephone, smart phone, music playing device, electronic reading device) server, workstation, and interconnected and/or distributed group of computers, as well as any other type of device having a microprocessor or microcontroller installed or embedded thereto, such as a field-programmable gate array (FPGA).

Referring again to FIG. 5A, the exemplary computer system 50 includes a central processor 51, associated memory 52 for storing programs and/or data, an input/output controller 53, a disk controller 54, a network interface 55, a display device 57, one or more input devices 58, a fixed or hard disk drive unit 59, a removal storage device/drive (optional) 60, optionally a backup storage device (e.g., a tape drive unit) (not shown) and a data bus 56 coupling these components to allow communication therebetween.

The central processor 51 can be any type of microprocessor, such as a PENTIUM-family processor, made by Intel of Santa Clara, Calif. The display device 57 can be any type of display, such as a liquid crystal display (LCD), plasma display, cathode ray tube display (CRT), light emitting diode (LED), touch screen display, and the like, capable of displaying, in whole or in part, any desired information. The input device 58 can be any type of device capable of providing the desired inputs, such as keyboards, numeric keypads, touch screens, pointing devices, switches, styluses, and light pens. The network interface 55 can be any type of a device, card, adapter, or connector that provides the computer system 50 with network access to a computer or other device, such as a printer. For example, the network interface 55 can enables the computer system 50 to connect to a computer network such as the Internet. Other computer accessories well-known to those of skill in the art (e.g., microphones, cameras, speakers, biometric access-control devices such as fingerprint scanners, etc.), although not illustrated in the block diagram of FIG. 5A, can of course be included as part of the computer system 50.

Several illustrative embodiments of the invention will now be described. In addition to the block diagrams and tables of FIGS. 6A-17 being described below, those of skill in the art are encouraged to view these diagrams in connection with FIGS. 18A-18F, which together are a listing of a CORBA pseudo-IDL (PIDL) that maps to the custom-IOP Message Headers of FIGS. 6-12. The CORBA PIDL of FIGS. 18A-18F provide details for implementing two versions of an custom-IOP message header (i.e., in FIGS. 6 and 7), as well as details for implementing custom-IOP Request and Reply headers, together with their corresponding service context headers (i.e., in FIGS. 8-11). Although the CORBA PIDL of FIGS. 18A-18F shows implementation details for all types of headers and all message types one of skill in the art can readily understand how to implement this PIDL (e.g., via IDL compile directives) so that the PIDL is configured to implement any subset of message types and/or to implement any version described herein, and/or to implement any future versions of the GIOP.

In addition, regarding the CORBA PIDLs of FIGS. 18A-18F, it can be seen that the addressing type is an octet, which CORBA does not support at the time of this writing. That is, the code listing of FIGS. 18A-18F is a PIDL because it does not compile as written, because the Object Management Group (OMG) specification for CORBA, at this writing, does not support octet types as a discriminate value for a union. It is believed, however, that the OMG that sets the standards for CORBA is capable of supporting octet types as a discriminate value, and, that such an omission of octet types from the CORBA specification might be an inadvertent oversight. Furthermore, as those of skill in the art will appreciate, individual vendors can readily adapt CORBA to support octet types as a discriminate value.

Note, however, that the PIDL of FIGS. 18A-18F was verified being workable by changing temporarily the addressing disposition type to be an "unsigned short" so that it would compile. Thus, one of skill in the art can readily appreciate that, if and when the present CORBA specification is adapted to support octet addressing disposition types, the PIDL of FIGS. 18A-18F will, in fact, be a compilable IDL. Although the CORBA PIDLs of FIGS. 18A-18F, however, are provided, with an octet addressing disposition, one of skill in the art will recognize the inventive structures and methods contained therein (and further described in the flow chart of FIG. 19) can readily be adapted to any desired addressing disposition.

Figure 6A:
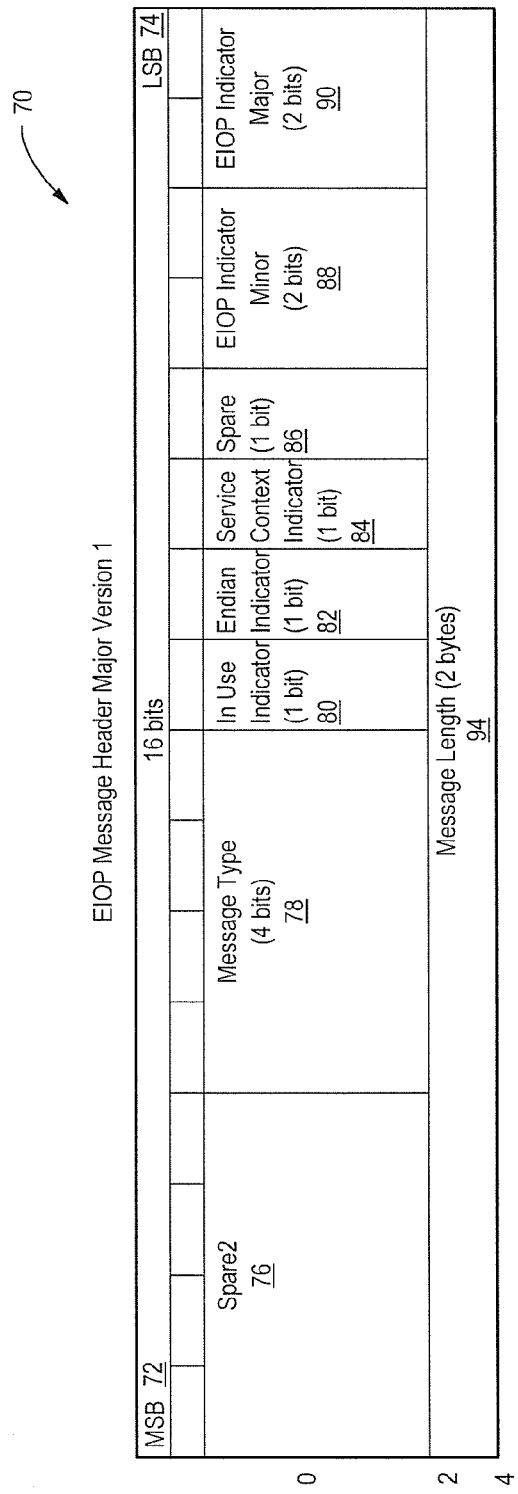
FIG. 6A is a diagram of an EIOP Message Header, Version 1, in accordance with one embodiment of the invention.
Figure 6B:
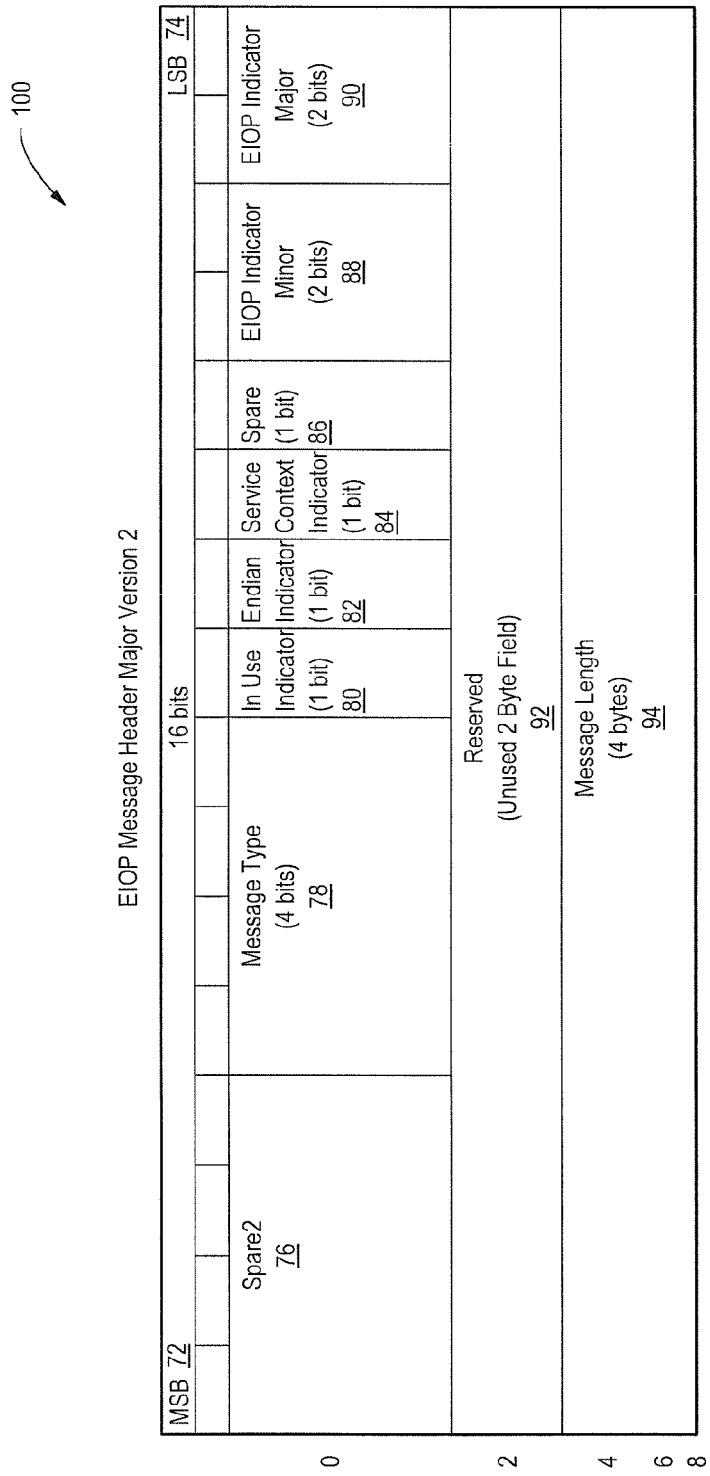
FIG. 6B is a diagram of an EIOP Message Header, Version 2, in accordance with one embodiment of the invention.

FIG. 6A is a diagram of an custom-IOP Message Header 70, Major Version 1, in accordance with one embodiment of the invention, and FIG. 6B is a diagram of an custom-IOP Message Header 100, Major Version 2, in accordance with one embodiment of the invention. FIG. 7 is a table comparing the custom-IOP Message Header Major Version 1 of FIG. 6A and the custom-IOP Message Header Major Version 2 of FIG. 6B with the prior GIOP Message Header (e.g., of FIGS. 2 and 3). With the embodiments shown in FIGS. 6A and 6B, two different embodiments (termed "Major Version 1" (FIG. 6A) and "Major Version 2" (FIG. 6B) of an optimized custom-IOP header are presented, in accordance with embodiments of the invention. Each of these optimized custom-IOP headers is an alternate way, in accordance with the invention, of replacing the prior art GIOP header 30 of FIG. 2. As is explained further below, the custom-IOP message headers 70 and 100 headers differ primarily in terms of the size of Request and Reply messages that are supported. The custom-IOP Message Header 70, Major Version 1 (FIG. 6A) supports Request and Reply messages that are smaller than 64K bytes (where K is understood in the art to mean 1024 bytes); the custom-IOP Message Header 100, Major Version 2 (FIG. 6B), supports Request and Reply messages greater than or equal to 64K.

The invention provides several options to determine whether a Major Version 1 custom-IOP Message Header is to be used or whether a Major Version 2 custom-IOP Message header is to be used. In one embodiment, at run time, when compiling the IDL or version of PIDL, (e.g., an IDL based on the PIDL of FIGS. 18A-18F), the header of the IDL (or PIDL) provides an indication (e.g., a flag, such as an IDL compiler flag) as to the version that is being used and also which minor indicator is being used. For example, the exemplary IDL of the embodiment of FIGS. 18A-18F supports two "Major versions" (e.g., version 1 EIOP and version 2 EIOP), and each Major version supports three Minor versions. (Minor 0, Minor 1, and Minor 2). Alternately, in another embodiment, at run-time, the version (i.e., version 1 or version 2) is checked by the ORB running the IDL. The Major versions determine message size that will be supported, and the Minor versions determine the Addressing Disposition values and TargetAddress type for a request header.

Figure 19A:
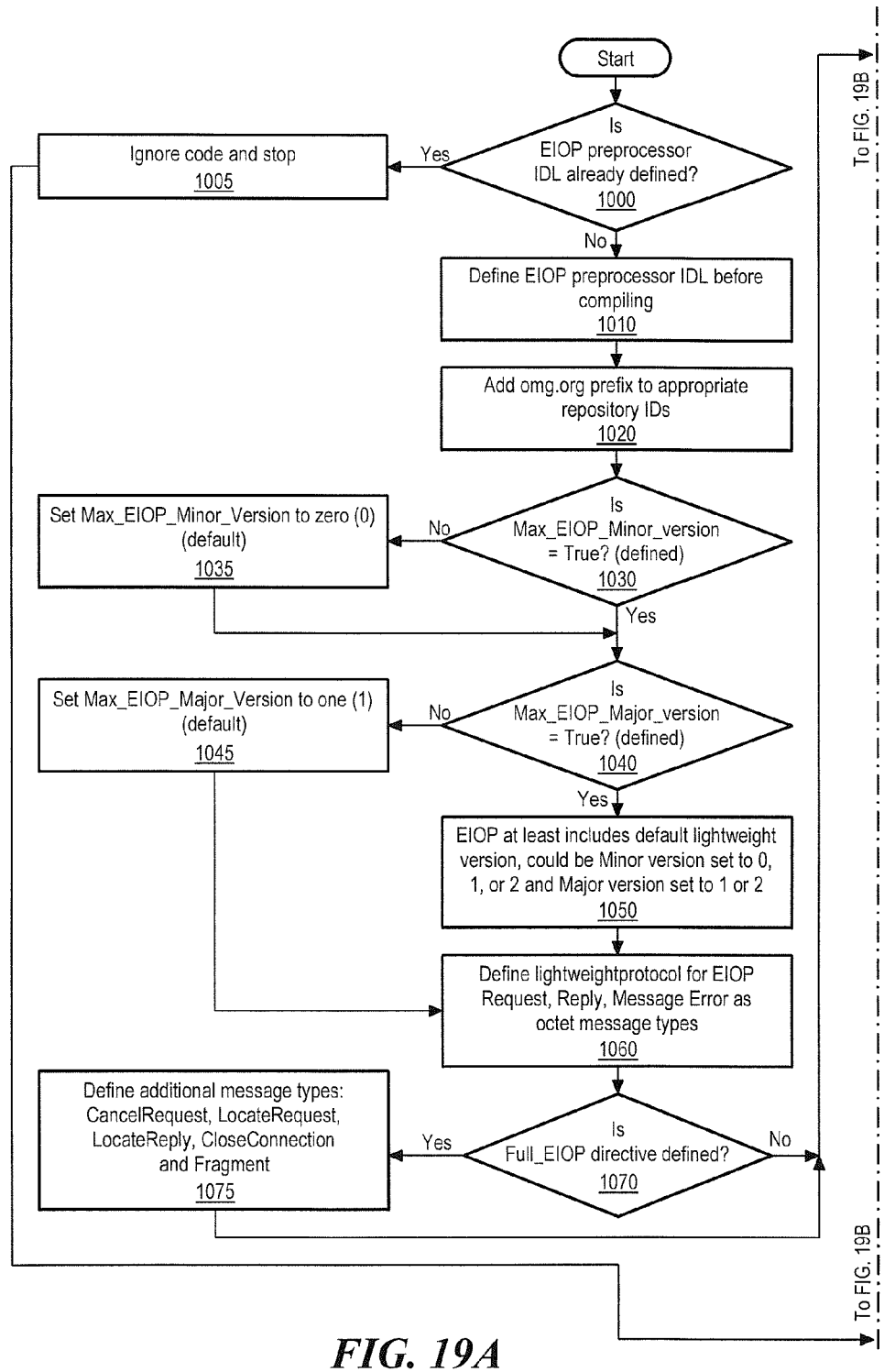
FIG. 19A-19B is a flow chart illustrating the operation of the PIDL of FIGS. 18A-18F, in accordance with one embodiment of the invention.
Figure 19B:
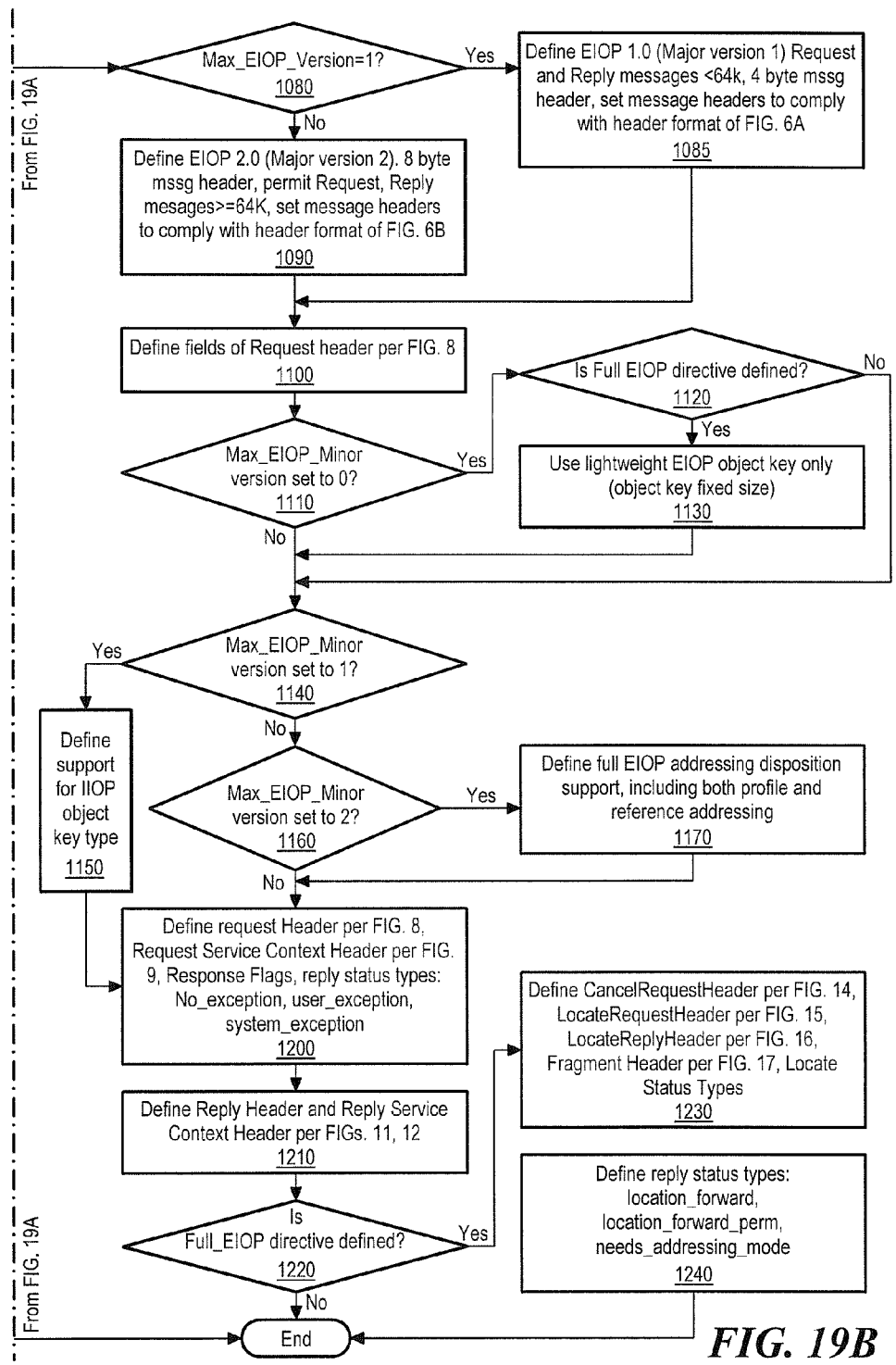

As a further illustration of the exemplary embodiment, consider FIG. 19A-19B, which is a flow chart depicting the processes of the exemplary PIDL of FIGS. 18A-18F, in accordance with one embodiment of the invention. Portions of this flow chart illustrate how custom-IOP versioning is determined, in accordance with an exemplary embodiment of the invention. Referring to FIGS. 19A-19B, at the start, prior to compiling, a check is made to see whether an EIOP preprocessor IDL is already defined (block 1000). If the answer is yes, the code is ignored and processing stops (block 1005). If the answer is no, then the EIOP preprocessor IDL is defined before compiling (block 1010), and an "omg.org" prefix is added to appropriate repository identifiers (IDs) (block 1020). Referring briefly to FIGS. 18A-18F and again to 19A-19B, prior to compiling, a check is made (e.g., of corresponding compiler flags) to see if a Minor Version (discussed further herein) is defined (block 1030) and whether a Major Version is defined (block 1040). If no Minor Version is defined, a default of Minor Version Zero (0) is assumed (block 1035). If no Major Version is defined, a default of Major Version 1 is assumed (block 1045). This combination of Major Version 1 and Minor Version 0 is also referred to herein as a "lightweight" custom-IOP protocol, in accordance with one embodiment of the invention, where the lightweight protocol supports only the message types of Request, Reply, and MessageError (blocks 1050, 1060) and supports only one type of addressing mode. In at least one embodiment, this so-called Lightweight custom-IOP protocol is the default protocol.

Note also that, in accordance with the PIDL of FIG. 18A-18F and the flowchart of FIG. 19A-19B, even if there is a defined Minor Version and a Defined Major Version, the custom-IOP will always provide at least the lightweight custom-IOP behavior (e.g., "lightweight EIOP") of Minor Version 0 and Major Version 1 (i.e., will always support at least Request, Reply, and Message Error types, of a size less than 64K). As explained below, the Major versions 1 and 2 differ primarily in allowed message size. In addition, as will be explained further herein, the addition Minor Versions of the protocol (Minor Version 1 and Minor Version 2) described herein provides some additional capabilities, including additional message types and/or additional addressing modes. For example, Minor Version 1 provides some additional addressing mode behavior, but not all the addressing mode behavior provided in the GIOP. Minor Version 2 supports all GIOP message types and all GIOP address modes and is the embodiment that is considered the "full EIOP" protocol, as it supports all capabilities of GIOP (in particular GIOP version 1.3).

Although the embodiments of the invention described herein are, by example only, limited to the particular combination of Major and Minor Versions described in the illustrated embodiments, those of skill in the art will recognize that the invention is not so limited. Other types of versions (e.g., versions supporting some other message size, versions supporting some other subset of GIOP features) are within the spirit and scope of the invention, as will be appreciated by those of skill in the art.

Referring now to FIGS. 6A, 6B, 18A-18F, and 19A-19B, if it is known in advance that messages being used in a given environment are always going to be greater than a first predetermined size (which for exemplary purposes only is 64 kilobytes (64K)), e.g., if a compiler directive is defined (exists) where the compiler directive's existence indicates that the FULL-EIOP protocol is required (block 1070), then the so-called "Major Version 2" optimized EIOP header 100, as shown in FIG. 6B, is used (block 1075). If the compiler directive for FULL_EIOP is not defined (i.e., does not exist) (block 1070), then the so-called "Major Version 1" optimized EIOP header 70, as shown in FIG. 6A, i.e., the default Lightweight EIOP, is used. Note that all custom-IOP (e.g., EIOP) versions, including at least those described in accordance with the embodiments of the invention disclosed herein, are capable of supporting the full GIOP message set (i.e., implementing the FULL_EIOP protocol) by defining the compiler directive for FULL_EIOP when compiling the IDL.

The FULL_EIOP protocol defines additional message types beyond the Request, Reply, and Message Error types of the Lightweight EIOP protocol (see, e.g., the aforementioned CORBA specification and the PIDL of FIGS. 19A-19E). In addition, the implementation of these additional message types in the FULL_EIOP embodiment, as compared with the prior art GIOP, are explained briefly further herein, in connection with FIGS. 14-17.

As noted above, the Lightweight EIOP, Major Version 1 protocol of FIG. 6A is more optimized (e.g., condensed), than the so-called "Major Version 2" optimized EIOP header 100 of FIG. 6B, which is used when it is known in advance that message sizes are bigger than the first predetermined message size (which is 64K, in this example, but this is not limiting. In at least one embodiment, the message length field is defined as 2 bytes, which is equivalent in this embodiment to 64K).

Referring still to FIGS. 6A, 6B, 18A-18F, and 19A-19B, after determining whether or not the implementation will be FULL_EIOP, a check is made to determine if the Major Version is set to 1 or 2 (block 1080). If the Major Version is set to 1, then request and reply messages will have a size <64K, and message header are defined to comply with the EIOP message header format of FIG. 6A (block 1085). If the Major Version is set to 2, then there is an 8 bytes message header, and Request and Reply messages can be ≥64K and are defined to comply with the EIOP message header format of FIG. 6B (block 1090).

FIG. 7 is a table that compares the EIOP Major Version 1 protocol of FIG. 6A and the EIOP Major Version 2 protocol of FIG. 6B with the GIOP Header of FIGS. 2-4, in accordance with one embodiment of the invention. Referring again to FIGS. 2, 6A, 6B and also to the comparison Table 1 of FIG. 7, it can be seen that the Major Version 1 EIOP Message Header 70 and the Major Version 2 EIOP Message Header 100 are each a customized, optimized, and modified version of the prior art GIOP message header 30 of FIG. 2. As FIGS. 6A, 6B, and 7 illustrate, the EIOP message header Major Version 1 70 has a size of 32 bits (i.e., overall size of 4 bytes, at 8 bits/byte), from MSB 72 to LSB 74, and the EIOP message header for Major Version 2 100 has a size of 64 bits (i.e., overall size of 8 bytes) as compared with 96 bits (12 bytes) of the prior art GIOP message header 30. The Major Version 2 optimized EIOP header 100 of FIG. 6B is, overall, 4 bytes bigger than the version 1 optimized EIOP header 70 of FIG. 6A, via the increased message length of 8 bytes in the version 2 message header 100 vs. 4 bytes in the version 1 message header 70. This particular increase in size (4 bytes) is not limiting and will, of course, depend on the message sizes used/desired in a given environment. As those of skill in the art will appreciate, a developer will know in advance, at the time of building and/or deploying a given system, the size of messages being used in that system. Importantly, yet the Major Version 1 header and Major Version 2 header are each still able to convey the same information that was conveyed in the prior art GIOP message.

Referring still to FIGS. 2, 3, 6A, 6B, and 7, it can be seen that magic number field 33 of the prior art GIOP message header 30 (also known as the "identifier" field) is the only field that has been eliminated in the EIOP Major and Minor message headers 70, 100, respectively. As those of skill in the art will appreciate, in the system or embedded environment in which the invention is implemented, the identification provided by the magic number is not needed: that is, if the magic number is not present, the message inherently is considered to be a type of EIOP message. The prior art message type field 36, which had a size of one octet (i.e., 8 bits) is replaced in the Major Version 1 EIOP message header 70 and the Major Version 2 EIOP message header 100 with a message type field 78 of just 4 bits. This message type field 78 is big enough, however, to represent all CORBA message types, if it is desired, as it is in at least some embodiments, to represent some or all CORBA message types.

Referring still to FIGS. 2, 3, 6A, 6B and 7, the Major Version 1 EIOP message header 70 and the Major Version 2 EIOP message header 100 each conveys all of the information of the prior art GIOP header 30, using differently named and configured fields not present in the prior art, as is explained further below. For example, the Major Version 1 EIOP message header 70 and Major Version 2 EIOP message header 100 each includes an In Use indicator field 80, having a size of one bit, which field 80 indicates if the IOP is use (shared memory usage/shared memory transports). A value of false (0) indicates not in use; a value of true (1) indicates in use. This enables an EIOP message to be shared between a client and server without being copied. The Endian indicator field 82, having a size of one bit, indicates Little Endian byte orientation when set. A value of false (0) indicates a big-endian byte sequencing; true (1) indicates little-endian byte sequencing (as is known in the art, Big Endian means that the most significant byte of any multibyte data field is stored at the lowest memory address, which is also the address of the larger field, and Little Endian means that the least significant byte of any multibyte data field is stored at the lowest memory address, which is also the address of the larger field). This conveys information similar to the prior art flags field 35.

Referring again to FIGS. 6A and 6B, the Service Context Indicator field 84, having a size of one bit, indicates whether the request or reply header contains service context information. A value of false (0) indicates no service context; true (1) indicates service context is present. If that bit is set, then that means that the request or the reply has service context information in it. This helps to indicate which request or which reply header will be used. Note that, as shown in FIGS. 3 and 4, the prior art Request and Reply messages each dedicate 4 bytes to a corresponding service context field 39 in their respective message headers, thereby inherently indicating, in the prior art Request and Reply messages, the presence or non-presence of service context information. In contrast, in the Major Version 1 EIOP header 70 of FIG. 6A and Major Version 2 EIOP header 100 of FIG. 6B, there is a more compact definition of service context, via the service context indicator field 84, a 1 bit field that can indicate whether or not service context is present. This helps to eliminate having to have a message length indicator in the EIOP header. With the Major Version 1 EIOP header 70 and Major Version 2 EIOP header 100, the service context information is similar to that service context information for the GIOP request and reply (e.g., in FIG. 3), but defined in a more compact structure. Also, as described further herein, sequence types are marshaled differently for the sequence length. Based on the setting of the service context indicator field 84, the header to use for a given request or a given reply can be determined.

There is a first spare bit field 86, having a size of one bit. There also is a second spare bit field Spare2 76 having a size of four bits. Users can designate any desired use for these spare bit fields. In one embodiment, for example, the first spare bit field 86 is to indicate and/or support use of fragmented messages, such as indicating that a fragment is present or not. The EIOP Indicator Minor field 88 an EIOP Indicator major field 90 are specific to the embodiments described herein as to their indication, but functionally serve a similar purpose to the GIOP major and minor version fields. The message length field 94, having a size of 16 bits (2 bytes/octets) is similar to the prior art message_size field 37, except that it conveys the message body size in 2 bytes (EIOP) instead of 4 bytes (GIOP).

As noted above, FIG. 6B is a diagram of a version 2 EIOP Message Header 100, in accordance with one embodiment of the invention. The fields in the version 2 EIOP Message Header 100 are identical to the corresponding and similarly named and numbered fields in the version 1 EIOP Message Header 70 of FIG. 3, except that the version 2 EIOP Message Header does contain additional information. The version 2 EIOP Message Header 100 differs from the version 1 EIOP Message Header 70 by including a reserved field 92 (which is an unused 2 byte/16 bit field) and a longer message length (4 bytes/32 bits for version 2 EIOP Message Header, versus 2 bytes/16 bits for version 1 EIOP Message Header.

In the following descriptions of EIOP Request and Reply headers (including those with service context), of FIGS. 8-12, it should be understood that these headers work in connection with the same types of request and reply messages as are used with GIOP (and, where applicable (e.g., Full EIOP), the other types of messages), but in a more condensed format. In addition, as will be appreciated by those of skill in the art, the exemplary EIOP request and reply headers work with all Major and Minor versions of the EIOP described herein, with particular differences noted in the Tables of FIGS. 7, 10, and 13-17.

FIG. 8 is a diagram of an EIOP Request Header 120, in accordance with one embodiment of the invention, FIG. 9 is a diagram of an EIOP Request Header with Service Context 150 (referred to as EIOP Request Service Context Header 150), in accordance with one embodiment of the invention, and FIG. 10 is a table comparing the EIOP Request Headers of FIGS. 8 and 9 and of other embodiments of the invention with the GIOP Request Header. The request headers of FIGS. 8 and 9 are very similar, except that the EIOP Request Service Context Header 150 of FIG. 9 includes additional fields for Service Context, as described further below. Thus, for fields common to both the EIOP Request Header 120 and the EIOP Request Service Context Header 150, the description is the same.

Referring to FIGS. 8 and 9, as with the EIOP message header 70, the EIOP Request Header 120 and EIOP Request Service Context Header 150 each provide a more compact version of the GIOP Request Header 38 (FIG. 3). The EIOP Request Header 120 and EIOP Request Service Context Header each, independently, conveys the same information as the GIOP Request Header 38 and performs the same functions as the GIOP Request Header 38. The EIOP Request Header 120 and the EIOP Request Service Context Header 150 are each a 16 bit header. Each type of request header 120, 150 includes a three (3) bit Response flags field 122; where the settings of this field are described in the Common Object Request Broker Architecture (CORBA) Specification, Version 3.1.1 *Part 2: CORBA Interoperability*, states:

response_flags is set to 0x0 for a SyncScope of NONE and WITH_TRANSPORT. The flag is set to 0x1 for a SyncScope of WITH_SERVER. A non exception reply to a request message containing a response_flags value of 0x1 should contain an empty body, i.e., the equivalent of a void operation with no out/inout parameters. The flag is set to 0x3 for a SyncScope of WITH_TARGET. These values ensure interworking compatibility between this and previous versions of GIOP. For GIOP 1.0 and 1.1 a response_expected value of TRUE is treated like a response_flags value of \x03, and a response_expected value of FALSE is treated like a response_flags value of \x00. • reserved is always set to 0 in GIOP 1.1. These three octets are reserved for future use.

The Request_ID field 126 of each type of request header 120, 150 is a 13 bit field, which (as Table 2 of FIG. 10 shows) is smaller than the 4 bytes of the GIOP. As can be seen in FIGS. 8 and 9 with a Response flags 122 of 3 bits and a Request ID 126 of 13 bits, the total combined of these two fields is 16 bits/2 bytes, but the comparison chart of FIG. 10 lists all two bytes as falling under the Request ID 126 field and 0 bytes in the Response flags 122 (Table 2 of FIG. 10, for convenience, shows individual fields rounded up or down to the nearest byte, but the total number of bytes, of course, matches the actual total number of bytes).

The Target field in the GIOP (e.g., GIOP 1.3) maps to several fields in the EIOP Request Header 120 of FIG. 8 (and the EIOP Request Service Context Header 150 of FIG. 9), including: the Target-EIOP Object Key 128 (also referred to herein as object number field 128), the Target Addressing Disposition field 130 and the Target-EIOP Object Key 127, where the Target-EIOP Object key 127 is a field itself includes subfields that include a User Defined indicator 134, a Transient Indicator 136, a Portable Object Adapter (POA) Identifier (ID) 138, and Transient Random Data 140.

In the GIOP, the Target field in a request header is defined as a union, and the addressing disposition discriminant type determines the type of target object reference. In the exemplary custom-IOP (e.g., EIOP), the addressing disposition discriminant type also determines the type of target object reference, but the contents of the Target field vary based on the setting of the Minor version (which, as noted earlier, indicates the addressing mode supported and the Target Address type for a request header). In addition, the exemplary custom-IOP described herein introduces a new target type, where the object key is 2 bytes and which is capable (via the Minor Versions 1 and 2) of supporting the other target object keys as defined in the GIOP. This is explained further below.

The fields that are included in the custom-IOP request header are at least partially dependent on the minor version of the custom-IOP and also help to ensure backwards compatibility with the various GIOP versions. For example, if the Minor Version is set to 0, the custom-IOP defines its target that is an object key of two bytes that is unique to the custom-IOP, as well as an object number 128 and object key flags 127 (all explained further below). If the Minor Version is set to 1 or 2, the respective custom-IOP supports the other GIOP addressing modes. For example, Minor Version 1 of the custom-IOP supports a custom-IOP object key and also an IOP:: Object Key. Minor Version 2 of the custom-IOP supports not only the custom-IOP object key but also all Inter Orb Protocol (IOP) addressing, as well as additional Interoperable Object References (IORs) and tagged profiles (this is further detailed in the PIDL of FIGS. 18A-18F).

If the Minor Version is set to 0, the custom-IOP request header 120 includes a Target-EIOP object Key of 128 object number field and 127 object key flags field, which are both 8 bits (1 byte/octet) in size and are fields unique to the custom-IOP (e.g., unique to EIOP). These fields also are unique to Minor Version 0. This Target EIOP Object Key 127 and 128 is a "scaled down" version of the Object key, because the Minor Version 0 supports only one addressing type. Note that for the other minor versions in the exemplary custom-IOP (e.g., Minor Version 1 and Minor Version 2), each has an object key length of one byte instead of the GIOP object key length of four bytes.

The Minor Version 0 (as well as Minor Versions 1 and 2) Target-EIOP object Key object number field 128 and object key flags field 127 is functionally equivalent to the Target field in the GIOP 1.3 Request header (and to the object_key field in the GIOP 1.0 and 1.1 request headers), and indicates the object that is the target of the invocation. For Minor Versions 1 and 2, the object key length is 1 byte in the custom-IOP, vs. 4 bytes in the GIOP.

As FIG. 8 and the PIDL of FIGS. 18A-18F illustrates (e.g., at top of FIG. 18C), the Object Number field 128 corresponds to byte 1 of the object key information. Byte 2 of the object key information, as shown in FIG. 8, includes a transient random data field 140 as its four LSBs, which is a random number for a transient object key. The two bits to the left of the transient Random Data are the POA ID field 138, field that identifies the portable object adapter that is the identifier associated with this object. The bit to the left of the POA ID field 138 is the transient indicator bit 136, which is a bit field that indicates if the object key is persistent or not: 0 means persistent, 1 means transient. The MSB of this byte 2 is the user-defined indicator bit 134, which is a bit field that indicates if the object key is user defined or orb defined.

The Minor Version 0 (as well as Minor Versions 1 and 2) also includes a Target-Addressing Disposition field 130, which is an 8 bit (1 byte/octet) field that can, for the custom-IOP protocol(s) described herein accommodate the target addressing dispositions in GIOP (i.e., EIOP Object Key, Object Key, ProfileAddr, ReferenceAddr) and thus indicate the type of target addressing. Note that this still requires an object key, as a different object key is defined for an embedded constraint environment, as will be understood by those of skill in the art.

The Operation field 132 is an 8 bit (1 byte/octet) field that indicates the corresponding operation number and is similar to the operation field 44 of FIG. 3, except that for the exemplary custom-IOP described herein it is a fixed size (vs. being unbounded in GIOP), enabling the operation name length of the GIOP to be eliminated in the custom-IOP. The custom-IOP request header 120 also includes marshaled parameters 142A-142D (FIG. 6B)/142E-142F (FIG. 8), which are fields where conventional CORBA marshalling rules take over, e.g., where parameters and user data go, as is well understood in the art (as is known, marshalling flattens complex data structures into a transportable representation, e.g., a stream of bytes, that not only contains the data itself, but also meta-information, such as the length of a certain entity or an encoding for its types). Marshaled parameters generally follow the end of a given header, and aren't part of the header itself, as is well understood in the art.

Both the custom-IOP Request Header 120 and the Request Service Context Header 150 include a number of marshaled parameters 142, and although they are numbered uniquely, they are not required to be different. In addition, in the Request Service Context Header 150, the Service Context information 152, 154, 156 is located at the end of the message, as is done in GIOP versions 1.2 and later (earlier version of GIOP as are illustrated in FIG. 3 herein, such as GIOP 1.0 and 1.1, have Service Context information at the start of the message).

As indicated in Table 2 of FIG. 10 (and also Table 3 of FIG. 13, which relates to Replay messages), the custom-IOP reduces the size of fields as compared with the GIOP. For Example, the number of service contexts field 152 is reduced from four (4) bytes in the GIOP to one (1) byte in the custom-IOP, for all versions of the custom-IOP. As Table 2 notes (and as discussed previously), the custom-IOP header 70, 100 includes a one (1) bit service context indicator field that indicates the presence of service contexts. The service context ID field 154 in the custom-IOP is reduced from four (4) bytes (in the GIOP) to one (1) byte in the custom-IOP, which allows for 256 possible service contexts (although CORBA at present has only 22). The service context length field 156 in the custom-IOP is reduced from four (4) bytes in the GIOP to one (1) byte in the custom-IOP, allowing a maximum number of 255 for the size of service context data In addition, the EIOP Request Service Context header 150 of FIG. 9 also illustrates that, in accordance with one embodiment, the EIOP of this embodiment of the invention implements changes in the unbounded sequence marshaling rules. As is known in the art, there are two kinds of sequences: bounded and unbounded. A bounded sequence has a maximum length that is part of the IDL sequence type and cannot be changed. An unbounded sequence has a flexible maximum length that can be set during construction and modified during processing. In either case, the maximum length determines the amount of buffer storage used by the sequence to hold its elements. In at least one embodiment of the invention, one CORBA marshaling rule that is changed, only for the EIOP header types, is as follows: string and sequence length is an octet type and not an unsigned long of four (4) bytes. This new marshaling rule for sequence types in EIOP is applicable for any sequence for request and reply messages. One reason this marshaling rule can be implemented is that, in EIOP embodiments described herein, there is no requirement to support object keys that are more than 255 bytes or service contexts that are more than 255, or the service context data being more than 255 bytes. So, the marshaling rule for sequence types can be changed, to enable compacting the message header information, instead of requiring extra bytes to specify the length of various fields, with "padding" of unused fields, as is done with the GIOP. As noted in Table 2, padding of the fields will occur for certain types, based on the types and how they are supposed to line up, as will be understood by those of skill in the art.

As an illustration of this marshaling rule change, consider Table 2 of FIG. 10, which compares the Request Header 120 and Request Service Context Header 150 of various Major and Minor modes, with the GIOP. In minor versions 1 and 2 that support the other addressing modes, where they include some type of sequence definition, the length of that corresponding object key 128 is only going to be a one byte field instead of four bytes. Thus, this is one area where the marshalling rule has changed. This type of reduction in size, as illustrated in Table 2, also can be seen in the number of service contexts, where all of the EIOP versions are using a field of just one (1) byte express the number of service contexts that are there, instead of a 4 byte length field as is done with GIOP.

In addition, as those of skill in the art are aware, GIOP requires that the number of elements be the first field and be an unsigned long value. However, in the EIOP of this embodiment, although the number of elements is again first, its size and alignment requirements are based upon the unbounded sequence index type. For the number of elements in sequence, its unbounded sequence index type is the sequence index type that defines the max number of elements for a sequence. This allows for better compaction of the encoded unbounded sequence type. This rule is similar to a union and its discriminate type. This allows the EIOP IDL file (FIGS. 18A-18F) to be compiled by an IDL compiler using this marshaling rule and not be treated as pseudo IDL.

The PIDL of FIGS. 18A-18F and Flow chart of FIGS. 19A-19B, both previously discussed in connection with Message header formatting, also show how to implement the other message types used in the EIOP, as applicable depending on version and/or whether FULL_EIOP directive is defined. Referring now to FIGS. 8-10, 18A-18F and 19A-19B, after the fields of the Request Header are defined (block 1100), a check is made as to whether the Minor Version is set to 0 (block 1110). If the answer is yes, and if the FULL_EIOP directive is defined (block 1120), then the implementation is defined to use only the lightweight EIOP object key (because object key is a fixed size, object key length is not necessary) (block 1130).

If the Minor Version is set to 1 (block 1140), then support is defined for the IIOP object key type (block 1150). If the Minor Version is set to 2 (block 1160), then full EIOP addressing disposition support is defined (block 1170). Regardless of the Major and Minor version, the Request Header is defined per FIG. 8, Request Header Service Context is defined per FIG. 9, Reply Header per FIG. 11, and Reply Service Context Header per FIG. 12, are defined as shown in the Figures and PIDL of FIGS. 18A-18F (blocks 1200 and 1210).

If the full_EIOP directive was defined (block 1220), additional Headers, Status types and Reply Status types are defined (blocks 1230 and 1240), as shown in FIG. 19 and in the PIDL of FIGS. 18A-18F.

FIG. 11 is a diagram of an EIOP Reply Header 160, in accordance with one embodiment of the invention, FIG. 12 is a diagram of an EIOP Reply Service Context Header 180, in accordance with one embodiment of the invention, and FIG. 13 includes Table 3, comparing the EIOP Replay Header 160 (and EIOP Reply Service Context Header 180) with the GIOP Reply Header. As with the above-described request headers of FIGS. 8 and 9, the reply headers of FIGS. 11 and 12 are very similar, except that the EIOP Reply Service Context Header 180 of FIG. 12 includes additional fields for Service Context, as described further below. Thus, for fields common to both the EIOP Reply Header 160 and the EIOP Reply Service Context Header 180, the description is the same.

Referring to FIGS. 11 and 12, the EIOP Reply header 160 and EIOP Reply Service Context Header 180 are each 16 bits long and each include a 3-bit Reply status field 162 and a 13-bit Request ID field 126 (as was noted above in connection with Table 2, Table 3 shows correct total bytes, but individual blocks round the bits up or down to the nearest byte; hence, Reply status of 3 bits shows up as "0" bytes and Request ID of 13 bits shows up as "2" bytes). The Reply status field 162 is similar to the reply status field 47 of FIG. 4 (the GIOP reply header). The Request ID field 126 is identical to the request_id field 40 of FIG. 4 (GIOP request header). The marshaled parameter field (142G, 142H in FIG. 12, 142i and 142J in FIG. 12) is similar to the marshaled parameters described previously in connection with the Request headers of FIGS. 8 and 9. The other comparisons in Table 3 (e.g., for Number of Service Contexts, Service Context Length, Service Context ID, etc.) between EIOP and GIOP are similar to those discussed in connection with Table 2.

FIG. 14 is a table comparing the EIOP cancel request with the GIOP cancel request, FIG. 15 is a table comparing the EIOP locate request with the GIOP locate request, FIG. 16 is a table comparing the EIOP locate reply with the GIOP locate reply, and FIG. 17 is a table comparing the EIOP fragment with the GIOP fragment, in accordance with one embodiment of the invention. As noted previously, these message types are implemented only in the FULL EIOP. Specific illustrations of each message type in EIOP are not shown, as each comparison table specifically indicates what is changed. For example, in each of the cancel request, locate request, locate reply, and fragment message types, the corresponding EIOP Request ID is a 13 bit (2 byte) number, instead of a four byte number as is done with the GIOP.

In addition, as Table 5 of FIG. 15 illustrates, the Addressing Disposition field is one byte instead of two, and can represent all addressing disposition modes. The Length of Object Key field is reduced from 4 bytes in GIOP to: 0 for Minor Version 0 (because the Object Key field in EIOP Minor Version has a fixed size, thus no need to specify length); and to 1, for Minor Versions 1 and 2. Other changes shown in Table 5 are similar to those discussed above in connection with Table 2.

In FIG. 16, which compares the LocateReply Header of GIOP with EIOP, because the Locate Status is part of the EIOP Request ID field (see FIGS. 8-10), this field can be eliminated from the Locate Reply header.

As those skilled in the art will recognize, the various embodiments of the invention described herein can be modified to accommodate and/or comply with any many different technologies and standards, including, for those embodiments utilized in an embedded environment such as the SDR, future SCA standards, including but not limited to SCA Next. In addition, the various embodiments of the invention described herein can be compatible with various versions of the GIOP protocol. For example, one version of the custom-IOP protocol described herein (i.e., the so-called "full EIOP" (with support for all GIOP message types)), Major Version 2, Minor Version 2, maps to GIOP 1.3, supporting all GIOP 1.3 message types, but using the custom-IOP fields described herein (to reduce the number of bits required to provide data). Another version of the custom-IOP protocol described herein (i.e., the so-called "lightweight EIOP") generally maps to GIOP 1.1, but supports a subset of the GIOP 1.1 message types (and supports a subset of the GIOP 1.3 message type). Furthermore, one of skill in the art will recognize that the various embodiments disclosed herein can be implemented using a bridge (e.g., an inter-ORB bridge) to translate between versions (e.g., to be backwards compatible to even earlier versions of the GIOP), which may be advantageous in certain implementations.

In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software.

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

It should also be appreciated that the IDL listings (including the PIDL), block diagrams, and flow charts provided herein do not depict the syntax of any particular programming language (although in some instances methods from C++, CORBA IDL and/or Java programming language have been provided by way of example). Rather, the flow diagrams and flow charts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit and scope of the invention.

Those skilled in the art will appreciate that computer systems embodying the present invention need not include every element shown in FIG. 2, and that equivalents to each of the elements are intended to be included within the spirit and scope of the invention. For example, the computer system 50 need not include the tape drive 28, and may include other types of drives, such as compact disk read-only memory (CD-ROM) drives, universal serial bus (USB) drives, and any other type of removable media onto which information can be stored. CD-ROM drives can, for example, be used to store some or all of the databases described herein.

Systems and methods in accordance with the invention can be implemented using any type of computer system running any one or more types of operating systems (including, by way of illustration and not limitation, the SDR environments and embedded environments described herein). Exemplary types of computer systems on which at least some embodiments of the invention can be embodied include any system or device having a processor (or equivalent processing functionality) installed or embedded, including but not limited to a desktop computer, personal computer (PC), laptop computer, notebook computer, tablet computer, handheld computer, netbook, personal digital device (including but not limited to personal digital assistant (PDA), mobile communications device (including but not limited to radio, conventional telephone, mobile/cellular telephone, smart phone, music playing device, electronic reading device) server, workstation, and interconnected group of computers, as well as any other type of device having a microprocessor installed or embedded thereto, such as a field-programmable gate array (FPGA).

In at least one embodiment of the invention, one or more computer programs, such as those further described herein, define the operational capabilities of the computer system 50. These programs can be loaded into the computer system 50 in many ways, such as via the hard disk drive 59, via one or more removable storage devices/drives 60 (e.g., a floppy disk drive, a tape drive 28, a CD-ROM drive, a USB drive, etc.) or via the network interface 55 (e.g., wirelessly, via the Internet, etc.) Alternatively, the programs can reside in a permanent memory portion (e.g., a read-only-memory (ROM)) chip) of the main memory 52. In another embodiment, the computer system 50 can include specially designed, dedicated, hard-wired electronic circuits that perform all functions described herein without the need for methods from computer programs.

In at least one embodiment of the present invention, the computer system 50 is networked to other devices, such as in a client-server or peer-to-peer system. The computer system 50 can, for example, be a client system, a server system, or a peer system. In one embodiment, the invention is implemented at the server side and receives and responds to requests from a client, such as a reader application running on a user computer. The computer system can be implemented as part of, controlling, or in operable communication with a terminal, personal computer, mainframe computer, workstation, hand-held device, electronic book, personal digital assistant, peripheral device, notebook computer, a handheld computing device (e.g., a PDA), an Internet appliance, a telephone, an electronic reader device, an SDR, or any other such device connectable to the computer network.

In addition, software embodying the present invention, in one embodiment, resides in an application or other program running on the computer system 50. In at least one embodiment, the present invention is embodied in a computer-readable program medium usable with the general-purpose computer system 50. In at least one embodiment, the present invention is embodied in a data structure stored on a computer or a computer-readable program medium. In addition, in one embodiment, the present invention is embodied in a transmission medium, such as one or more carrier wave signals transmitted between the computer system 50 and another entity, such as another computer system, a server, a wireless network, etc. The present invention also, in an embodiment, is embodied in an application programming interface (API) or a user interface. In addition, the present invention, in one embodiment, is embodied in a data structure.

Further, in describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

The invention claimed is:

1. A non-transient computer-readable storage medium storing computer program code that, when loaded into a computer system and executed thereon, causes the computer to:
    (a) compile an interface definition language (IDL) configured to provide a custom inter-orb protocol (custom-IOP);
    (b) configure a message header for a message in accordance with a specification in the IDL for at least a custom-IOP message header, wherein:
        (b-1) prior to compiling the IDL, the computer is configured to process a set of indicators defining certain features of the custom-IOP applicable to the custom-IOP message header and applicable to the message sent in accordance with the custom-IOP, the set of indicators comprising at least a first indicator defining the size of the message in the custom-IOP, the size of the message comprising one of a first message size and a second message size; and
        (b-2) the computer configures the custom-IOP message header to be in compliance with and convey equivalent information to the Common Object Resource Broker Architecture (CORBA) General Inter-Orb (GIOP) protocol and a corresponding respective GIOP message header; and
    (c) define the custom-IOP message header to replace the corresponding GIOP message header, wherein the custom-IOP message header requires fewer bits overall than the corresponding GIOP message header by changing or eliminating at least a portion of the fields in the corresponding GIOP message header, including at least:
        (c-1) eliminating a 4 byte (32 bit) GIOP magic number identifier field;
        (c-2) replacing an eight (8) bit GIOP flags field with a custom-IOP flags field having four (4) bits, the four bits comprising a one (1) bit in-use indicator field, a one (1) bit endian indicator field, a one (1) bit service context indicator field, and a one (1) bit spare field;
        (c-3) replacing an eight (8) bit GIOP message type field with a custom-IOP message type field having 4 bits; and (c-3) reducing the size of a GIOP message length field from four (4) bytes to two (2) bytes.

2. The computer-readable storage medium of claim 1, wherein the non-transient computer-readable storage medium is constructed and arranged to operate in a predetermined environment comprising a client and server that send and receive messages only in accordance with the custom-IOP.

3. The computer-readable storage medium of claim 2, wherein the modified custom-IOP message header, in combination with the set of indicators and the predetermined environment, is configured to convey the same information as the GIOP message header but using fewer bits than the GIOP message header.

4. The computer-readable storage medium of claim 2, wherein the predetermined environment comprises an embedded client-server system, such that the custom-IOP comprises an embedded-IOP (EIOP).

5. The computer-readable storage medium of claim 1, wherein the computer program code further causes the computer to change GIOP unbounded sequence marshaling rules for Embedded-IOP (EIOP) message headers.

6. The computer-readable storage medium of claim 1, wherein the custom-IOP is assigned a version, the version assigned by one of the following steps:
providing the version in a version number field in the custom-IOP message header;
receiving, at a time of compiling the computer program code, information indicating the version of the custom-IOP; and
assuming, if no version is indicated in the version number field and no version number is received at the time of compiling, that the version corresponds to a default version.

7. The computer-readable storage medium of claim 6, wherein, dependent on the version, the set of indicators further comprises a second indicator defining which CORBA GIOP message types are supported in the custom-IOP.

8. The computer-readable storage medium of claim 7, wherein the second indicator designates that all CORBA GIOP message types are supported in the custom-IOP.

9. The computer-readable storage medium of claim 7, wherein, dependent on the version and value of the second indicator, a size of the GIOP message header is selected to accommodate the number of CORBA GIOP message types that are supported.

10. The computer-readable storage medium of claim 6, wherein, dependent on the version, the set of indicators further comprises a third indicator defining a type of GIOP addressing disposition that is supported in the custom-IOP.

11. The computer-readable storage medium of claim 6, wherein, dependent on the version, the spare bit in the custom-IOP header is defined to be an indicator designating whether or not a fragment is present.

12. The computer-readable storage medium of claim 6 wherein the program code further causes the computer to:
(j) specify in the IDL a custom IOP LocateRequest Header;
(k) define the custom-IOP LocateRequest header to replace a corresponding GIOP LocateRequest header, wherein the custom-IOP LocateRequest header is configured to support at least one of a custom-IOP Target Addressing Disposition field, custom-IOP target object key, Embedded-IOP (EIOP)::ObjectKey, IOP::ObjectKey, custom-IOP target object key, IOP::TaggedProfile, Interoperable Object Reference (IOR)AddressingInfo, and wherein the custom-IOP LocateRequest header is configured to require fewer bits overall than the corresponding GIOP LocateRequest header by changing or eliminating at least a portion of the field in the corresponding GIOP LocateRequest header, including at least:
(k-1) replacing a 4 byte (32 bits) GIOP Request ID field with a custom-IOP 2 byte (13 bits) Request ID field;
(k-2) replacing a 2 byte (16 bits) GIOP Addressing Disposition field with a custom-IOP 1 byte (8 bits) Addressing Disposition field capable of representing all addressing disposition modes;
(k-3) if the version corresponds to a first predetermined version having a fixed size object key, then eliminating a 4 byte (32 bits) GIOP Length of Object Key field, reducing the size of a GIOP unbounded Object key field to 2 bytes (16 bits), and defining a custom-IOP target object key comprising a fixed-size object key, the fixed-size object key of the custom-IOP target object key being a size configured to accommodate a maximum possible number of objects allowed by a portable object adapter (POA) in an embedded client-server system;
(k-4) if the version specified in the version number field corresponds to a second predetermined version, the program code further causes the computer to replace the 4 byte (32 bits) GIOP length of object key field with a 1 byte (8 bits) custom-IOP length object key field, and define a custom-IOP target object key that comprises one of the EIOP::ObjectKey and the IOP::ObjectKey; and
(k-5) if the version specified in the version number field corresponds to a third predetermined version, the program code further causes the computer to replace the 4 byte (32 bits) GIOP length of object key field with the 1 byte (8 bits) custom-IOP length object key field, and define a custom-IOP target object key that is configured to support profile and reference addressing and which comprises one of the EIOP::ObjectKey, the IOP::ObjectKey, the IOP::TaggedProfile, and the ORAddressingInfo.

13. The computer-readable storage medium of claim 1, wherein the program code further causes the computer to:
(d) specify in the IDL a custom-IOP request header;
(e) define the custom-IOP request header to replace a corresponding GIOP request header, wherein the custom-IOP request header requires fewer bits overall than the corresponding GIOP request header by changing or eliminating at least a portion of the fields in the corresponding GIOP request header, including at least:
(e-1) replacing a 4 byte (32 bits) GIOP Request ID field and 4 byte (32 bits) GIOP Response flags field with a custom-IOP 2 byte (16 bits) Request field, wherein the three most significant bits (MSB) of the custom-IOP Request field are defined to be a three (3) bits custom-IOP Response flags field, and the remaining thirteen (13) bits are defined to be a custom-IOP Request ID field;
(e-2) replacing a 2 byte (16 bit) GIOP Target field with a 1 byte (8 bits) custom-IOP Target Addressing Disposition field, wherein the custom-IOP Target Addressing Disposition Field is sized to be sufficient to designate all addressing disposition modes that are used;
(e-3) replacing a GIOP unbounded Operation Name field with a 1 byte (8 bits) fixed size custom-IOP Operation Name field; and
(e-4) removing a 4 byte (32 bits) GIOP Operation Name length field.

14. The computer-readable storage medium of claim 13, wherein the custom-IOP message header further comprises a version number field and wherein, if a version specified in the version number field corresponds to a predetermined version, the program code further causes the computer to:
- (e-7) replace a 4 byte (32 bits) GIOP length of object key field with a 1 byte (8 bits) custom-IOP length object key field; and
- (e-8) define a custom-IOP target object key that comprises one of an Embedded-IOP (EIOP)::ObjectKey and an IOP::ObjectKey.

15. The computer-readable storage medium of claim 13, wherein the custom-IOP message header further comprises a version number field and wherein, if a version specified in the version number field corresponds to a predetermined version, the program code further causes the computer to:
- (e-9) replace a 4 byte (32 bits) GIOP length of object key field with a 1 byte (8 bits) custom-IOP length object key field; and
- (e-10) define a custom-IOP target object key that is configured to support profile and reference addressing and which comprises one of an Embedded-IOP (EIOP)::ObjectKey, an IOP::ObjectKey, an IOP::TaggedProfile, and Interoperable Object Reference (IOR)AddressingInfo.

16. The computer-readable storage medium of claim 13, wherein, if a setting of the service context indicator field is set to indicate the presence of service context information, the program code further causes the computer to:
- (e-7) replace a 4 byte (32 bits) GIOP Number of Service Contexts field with a 1 byte (8 bits) custom-IOP Number of Service Contexts field;
- (e-8) replace a 4 byte (32 bits) GIOP Service Context ID field with a 1 byte (8 bits) custom-IOP Service Context ID field; and
- (e-9) replace a 4 byte (32 bits) GIOP Service Context Length field with a 1 bytes (8 bits) custom-IOP Service Context Length field.

17. The computer-readable storage medium of claim 13, wherein the program code further causes the computer to:
- (e-10) modify a CORBA marshaling rule for sequence types associated with request messages, by changing a corresponding string and sequence type from an unsigned long having a size of four (4) bytes to an octet type having a size of one (1) byte; and
- (e-11) basing, for a given sequence associated with a request message, size and alignment requirements on an unbounded sequence index type.

18. The computer-readable storage medium of claim 13 wherein the program code further causes the computer to:
- (l) specify in the IDL a custom IOP LocateReply Header;
- (m) define the custom-IOP LocateReplyheader to replace a corresponding GIOP LocateReply header, wherein the custom-IOP LocateReply header requires fewer bits overall than the corresponding GIOP LocateReply header by changing or eliminating at least a portion of the fields in the corresponding GIOP LocateReply header, including at least:
  - (m-1) replacing a 4 byte (32 bits) GIOP Request ID field with a custom-IOP 2 byte (13 bits) Request ID field; and
  - (m-2) using the 3 bits Response Flags field of the custom-IOP request header to provide the information corresponding to a GIOP LocateStatus field; and
  - (m-3) eliminating the 4 byte (32 bits) GIOP LocateStatus field.

19. The computer-readable storage medium of claim 13, wherein the custom-IOP message header further comprises a version number field and wherein, if a version specified in the version number field corresponds to a predetermined version, the program code further causes the computer to:
- (e-5) remove a 4 byte (32 bits) GIOP length of object key field and
- (e-6) define a custom-IOP target object key comprising a fixed-size object key, the fixed-size object key of the custom-IOP target object key being a size configured to accommodate a maximum possible number of objects allowed by a portable object adapter (POA) in an embedded client-server system.

20. The computer-readable medium of claim 19, wherein the maximum possible number of objects comprises 256 objects and the fixed-size object key has a size of two-bytes.

21. The computer-readable storage medium of claim 1, wherein the computer program code further cause the computer to allow octet types as a discriminate value for a union.

22. The computer-readable storage medium of claim 1, wherein the program code further causes the computer to:
- (f) specify in the IDL a custom-IOP reply header;
- (g) define the custom-IOP reply header to replace a corresponding GIOP reply header, wherein the custom-IOP reply header requires fewer bits overall than the corresponding GIOP reply header by changing or eliminating at least a portion of the fields in the corresponding GIOP reply header, including at least
  - (g-1) replacing a 4 byte (32 bits) GIOP Request ID field and 4 byte (32 bits) GIOP Reply status field with a custom-IOP 2 byte (16 bits) Reply field, wherein the three most significant bits (MSB) of the custom-IOP Reply field are defined to be a three (3) bits custom-IOP Reply status field, and the remaining thirteen (13) bits are defined to be a custom-IOP Request ID field.

23. The computer-readable storage medium of claim 22, wherein, if a setting of the service context indicator field is set to indicate the presence of service context information, the program code further causes the computer to:
- (g-2) replace a 4 byte (32 bits) GIOP Number of Service Contexts field with a 1 byte (8 bits) custom-IOP Number of Service Contexts field;
- (g-3) replace a 4 byte (32 bits) GIOP Service Context ID field with a 1 byte (8 bits) custom-IOP Service Context ID field; and
- (g-4) replace a 4 byte (32 bits) GIOP Service Context Length field with a 1 byte (8 bits) custom-IOP Service Context Length field.

24. The computer-readable storage medium of claim 22, wherein the program code further causes the computer to:
- (g-5) modify a CORBA marshaling rule for sequence types associated with reply messages, by changing a corresponding string and sequence type from an unsigned long having a size of four (4) bytes to an octet type having a size of one (1) byte; and
- (g-6) basing, for a given sequence associated with a reply message, size and alignment requirements on an unbounded sequence index type.

25. The computer-readable storage medium of claim 1, wherein the custom-IOP uses an octet addressing type.

26. The computer-readable storage medium of claim 1, wherein the program code further causes the computer to:
- (h) specify in the IDL a custom IOP Cancel Header; and
- (i) define the custom-IOP cancel header to replace a corresponding GIOP cancel header, wherein the custom-IOP cancel header requires fewer bits overall than the corresponding GIOP cancel header by changing or eliminating at least a portion of the fields in the corresponding GIOP cancel header, including at least replacing a 4 byte (32 bits) GIOP Request ID field with a custom-IOP 2 byte (13 bits) Request ID field.

27. The computer-readable storage medium of claim 1 wherein the program code further causes the computer to:
(n) specify in the IDL a custom-IOP Fragment header; and
(o) define the custom-IOP Fragment header to replace the corresponding GIOP Fragment header, wherein the custom-IOP Fragment header requires fewer bits overall than the corresponding Fragment header by changing or eliminating at least a portion of the fields in the corresponding GIOP Fragment header, including at least replacing a 4 byte (32 bits) Request ID field with a custom-IOP 2 byte (13 bits) Request ID field.

* * * * *